US012062484B2

(12) United States Patent
Yang et al.

(10) Patent No.: US 12,062,484 B2
(45) Date of Patent: Aug. 13, 2024

(54) COIL COMPONENT

(71) Applicant: SAMSUNG ELECTRO-MECHANICS CO., LTD., Suwon-si (KR)

(72) Inventors: Ju Hwan Yang, Suwon-si (KR); Seung Mo Lim, Suwon-si (KR); Tae Jun Choi, Suwon-si (KR); Byung Soo Kang, Suwon-si (KR); Boum Seock Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 873 days.

(21) Appl. No.: 17/103,050

(22) Filed: Nov. 24, 2020

(65) Prior Publication Data

US 2022/0102065 A1 Mar. 31, 2022

(30) Foreign Application Priority Data

Sep. 28, 2020 (KR) ........................ 10-2020-0125667

(51) Int. Cl.
*H01F 27/32* (2006.01)
*H01F 17/00* (2006.01)
(Continued)

(52) U.S. Cl.
CPC ....... *H01F 27/323* (2013.01); *H01F 17/0013* (2013.01); *H01F 17/04* (2013.01);
(Continued)

(58) Field of Classification Search
CPC .... H01F 27/323; H01F 17/0013; H01F 17/04; H01F 27/022; H01F 27/292;
(Continued)

(56) References Cited

U.S. PATENT DOCUMENTS

2015/0357115 A1* 12/2015 Ohkubo .............. H01F 27/2804 336/192
2016/0268038 A1* 9/2016 Choi ..................... H01F 27/255
(Continued)

FOREIGN PATENT DOCUMENTS

| | | |
|---|---|---|
| JP | 2005-209992 A | 8/2005 |
| KR | 10-1548862 B1 | 8/2015 |
| KR | 10-2093149 B1 | 3/2020 |

*Primary Examiner* — Mang Tin Bik Lian
(74) *Attorney, Agent, or Firm* — MORGAN, LEWIS & BOCKIUS LLP

(57) ABSTRACT

A coil component includes a body having one surface, and one end surface and the other end surface connected to the one surface and opposing each other; a coil portion including lead-out patterns within the body; slit portions respectively disposed in an edge portion between the one end surface and the one surface of the body and an edge portion between the other end surface and the one surface of the body to expose the lead-out patterns; external electrodes disposed to be spaced apart from each other on the one surface and respectively extending to the slit portions to be connected to the lead-out patterns; and surface insulating layers, respectively disposed on the one end surface and the other end surface of the body. The surface insulating layers include a first insulating thin film including silicon dioxide ($SiO_2$), and a second insulating thin film including aluminum oxide ($Al_2O_3$).

26 Claims, 16 Drawing Sheets

I-I'

(51) Int. Cl.
*H01F 17/04* (2006.01)
*H01F 27/02* (2006.01)
*H01F 27/29* (2006.01)

(52) U.S. Cl.
CPC ......... *H01F 27/022* (2013.01); *H01F 27/292* (2013.01); *H01F 2017/0066* (2013.01); *H01F 2017/048* (2013.01)

(58) Field of Classification Search
CPC ....... H01F 2017/0066; H01F 2017/048; H01F 27/32; H01F 5/04; H01F 27/2804
See application file for complete search history.

(56) References Cited

U.S. PATENT DOCUMENTS

| | | | | |
|---|---|---|---|---|
| 2017/0098997 | A1* | 4/2017 | Hamada | H01F 1/0306 |
| 2017/0323725 | A1* | 11/2017 | Iso | H01F 27/292 |
| 2018/0096783 | A1* | 4/2018 | Fukuda | H01F 27/366 |
| 2018/0166198 | A1* | 6/2018 | Kim | H01F 27/022 |
| 2018/0182537 | A1* | 6/2018 | Shimizu | H01F 27/29 |
| 2019/0066908 | A1* | 2/2019 | Ueda | H01F 17/0013 |
| 2019/0189338 | A1* | 6/2019 | Kim | H01F 27/2828 |
| 2019/0259526 | A1* | 8/2019 | Cho | H01F 27/29 |
| 2020/0020477 | A1 | 1/2020 | Kang et al. | |
| 2020/0411232 | A1* | 12/2020 | Matsumoto | H01F 27/327 |

* cited by examiner

COIL COMPONENT

CROSS-REFERENCE TO RELATED APPLICATION(S)

The present application claims the benefit of priority to Korean Patent Application No. 10-2020-0125667, filed on Sep. 28, 2020 in the Korean Intellectual Property Office, the entire disclosure of which is incorporated herein by reference.

TECHNICAL FIELD

The present disclosure relates to a coil component.

BACKGROUND

An inductor, a coil component, is a typical passive electronic component used in electronic devices, along with a resistor and a capacitor.

As electronic devices gradually gain higher performance and become smaller, the number of electronic components used in electronic devices is increased while being miniaturized.

Conventionally, external electrodes of a coil component are formed on surfaces of a body, opposing each other in a length direction, respectively. Due to thicknesses of the external electrodes, overall length or width of the coil component may be increased. In addition, when the coil component is mounted on a mounting board, the external electrode of the coil component may be in contact with another component, disposed adjacent to the mounting board, to cause short-circuit.

SUMMARY

An aspect of the present disclosure is to increase an effective volume of a magnetic material.

According to an aspect of the present disclosure, a coil component includes a body having one surface, and one end surface and the other end surface connected to the one surface and opposing each other; a coil portion including a first lead-out pattern and a second lead-out pattern spaced apart from each other within the body; a first slit portion and a second slit portion, respectively disposed in an edge portion between the one end surface and the one surface of the body and an edge portion between the other end surface and the one surface of the body to expose the first lead-out pattern and the second lead-out pattern; a first external electrode and a second external electrode disposed to be spaced apart from each other on the one surface of the body and respectively extending to the first slit portion and the second slit portion to be connected to the first lead-out pattern and the second lead-out pattern; and surface insulating layers, respectively disposed on the one end surface and the other end surface of the body. The surface insulating layers include a first insulating thin film, including silicon dioxide ($SiO_2$), and a second insulating thin film including aluminum oxide ($Al_2O_3$).

According to an aspect of the present disclosure, a coil component includes a body having one surface, and one end surface and the other end surface connected to the one surface and opposing each other; a coil portion comprising a first lead-out pattern and a second lead-out pattern spaced apart from each other within the body; a first slit portion and a second slit portion, respectively disposed in an edge portion between the one end surface and the one surface of the body and an edge portion between the other end surface and the one surface of the body to expose the first lead-out pattern and the second lead-out pattern; a first external electrode and a second external electrode disposed to be spaced apart from each other on the one surface of the body and respectively extending to the first slit portion and the second slit portion to be connected to the first lead-out pattern and the second lead-out pattern; and a surface insulating layer disposed at least on the one end surface and the other end surface of the body, being in contact with the body, and exposing portions of the first electrode and the second external electrode respectively disposed in the first and second slit portions.

According to an aspect of the present disclosure, a coil component includes a body having one surface, and one end surface and the other end surface connected to the one surface and opposing each other; a coil portion comprising a first lead-out pattern and a second lead-out pattern spaced apart from each other within the body; a first slit portion and a second slit portion, respectively disposed in an edge portion between the one end surface and the one surface of the body and an edge portion between the other end surface and the one surface of the body to expose the first lead-out pattern and the second lead-out pattern; a first external electrode and a second external electrode disposed to be spaced apart from each other on the one surface of the body and respectively extending to the first slit portion and the second slit portion to be connected to the first lead-out pattern and the second lead-out pattern; a surface insulating layer disposed at least on the one end surface and the other end surface of the body; and slit insulating layers, respectively disposed in the first and second slit portions to cover the connection portions of the first and second external electrodes. Among the surface insulating layer and the slit insulating layers, only the surface insulating layer is deposed on the one end surface and the other end surface of the body.

BRIEF DESCRIPTION OF DRAWINGS

The above and other aspects, features, and advantages of the present disclosure will be more clearly understood from the following detailed description, taken in conjunction with the accompanying drawings.

DETAILED DESCRIPTION

Figure 1:
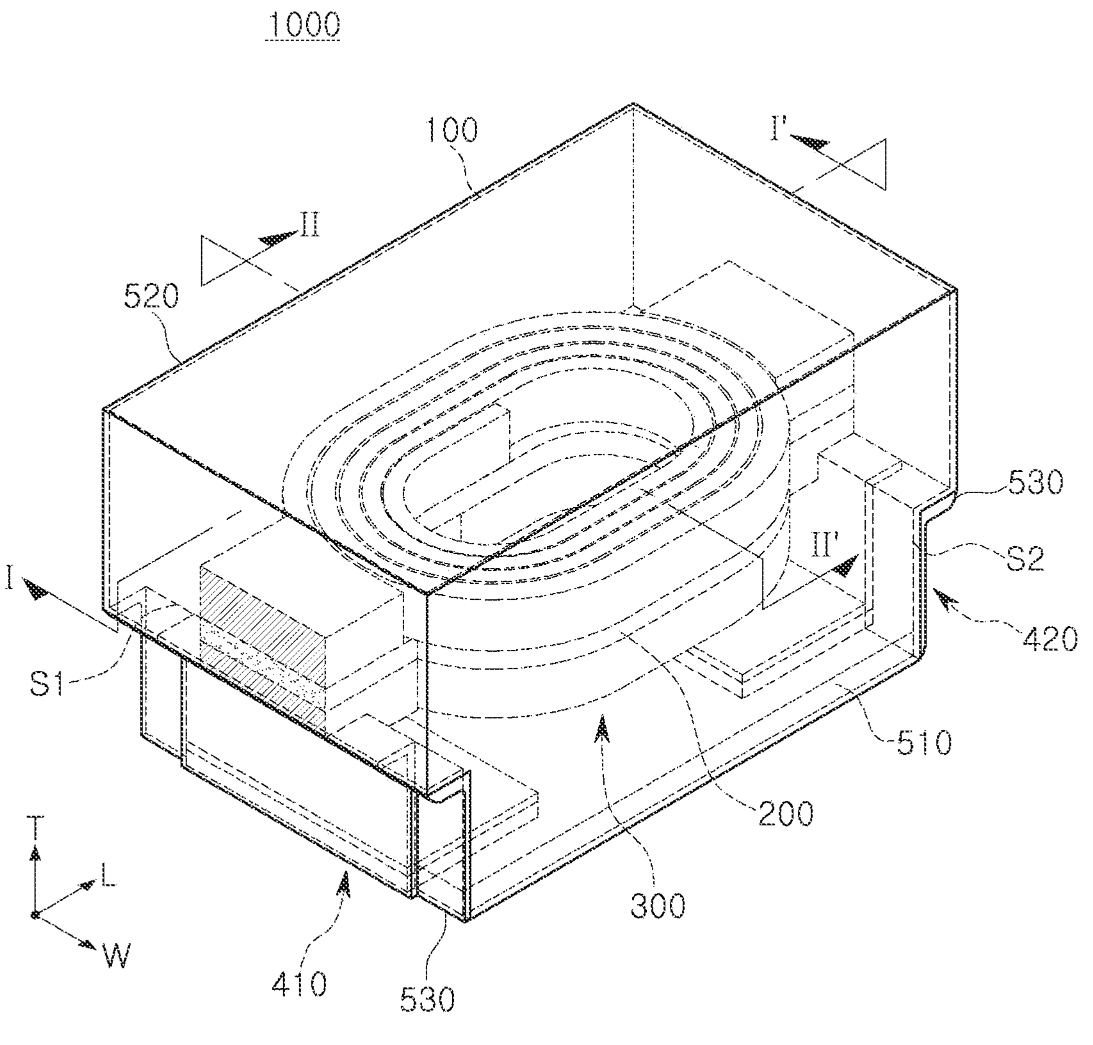
FIG. 1 is a schematic perspective view of a coil component according to an exemplary embodiment of the present disclosure.

The terms used in the description of the present disclosure are used to describe a specific embodiment, and are not intended to limit the present disclosure. A singular term includes a plural form unless otherwise indicated. The terms "include," "comprise," "is configured to," etc. of the description of the present disclosure are used to indicate the presence of features, numbers, steps, operations, elements, parts, or combination thereof, and do not exclude the possibilities of combination or addition of one or more additional features, numbers, steps, operations, elements, parts, or combination thereof. Also, the terms "disposed on," "positioned on," and the like, may indicate that an element is positioned on or beneath an object, and does not necessarily mean that the element is positioned above the object with reference to a direction of gravity.

Terms such as "coupled to," "combined to," and the like, may not only indicate that elements are directly and physically in contact with each other, but also include the configuration in which another element is interposed between the elements such that the elements are also in contact with the other component.

Sizes and thicknesses of elements illustrated in the drawings are indicated as examples for ease of description, and the present disclosure are not limited thereto.

In the drawings, an L direction is a first direction or a length (longitudinal) direction, a W direction is a second direction or a width direction, a T direction is a third direction or a thickness direction.

Hereinafter, a coil component according to an exemplary embodiment of the present disclosure will be described in detail with reference to the accompanying drawings. Referring to the accompanying drawings, the same or corresponding components may be denoted by the same reference numerals, and overlapped descriptions will be omitted.

In electronic devices, various types of electronic components may be used, and various types of coil components may be used between the electronic components to remove noise, or for other purposes.

In other words, in electronic devices, a coil component may be used as a power inductor, a high frequency (HF) inductor, a general bead, a high frequency (GHz) bead, a common mode filter, and the like.

ONE EMBODIMENT AND MODIFIED EXAMPLES

Figure 2:
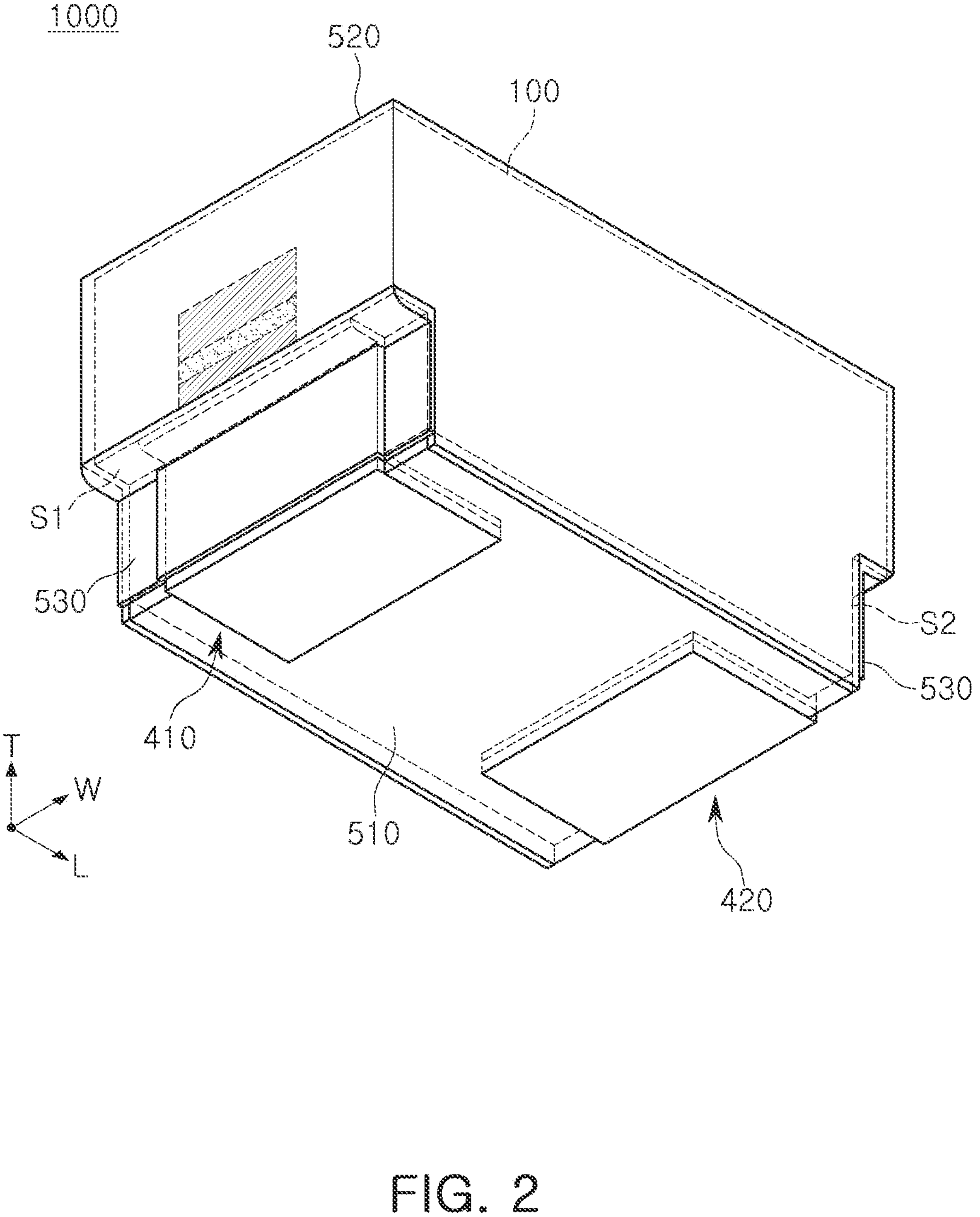
FIG. 2 is a perspective view of FIG. 1 when viewed from a lower side thereof.
Figure 3:
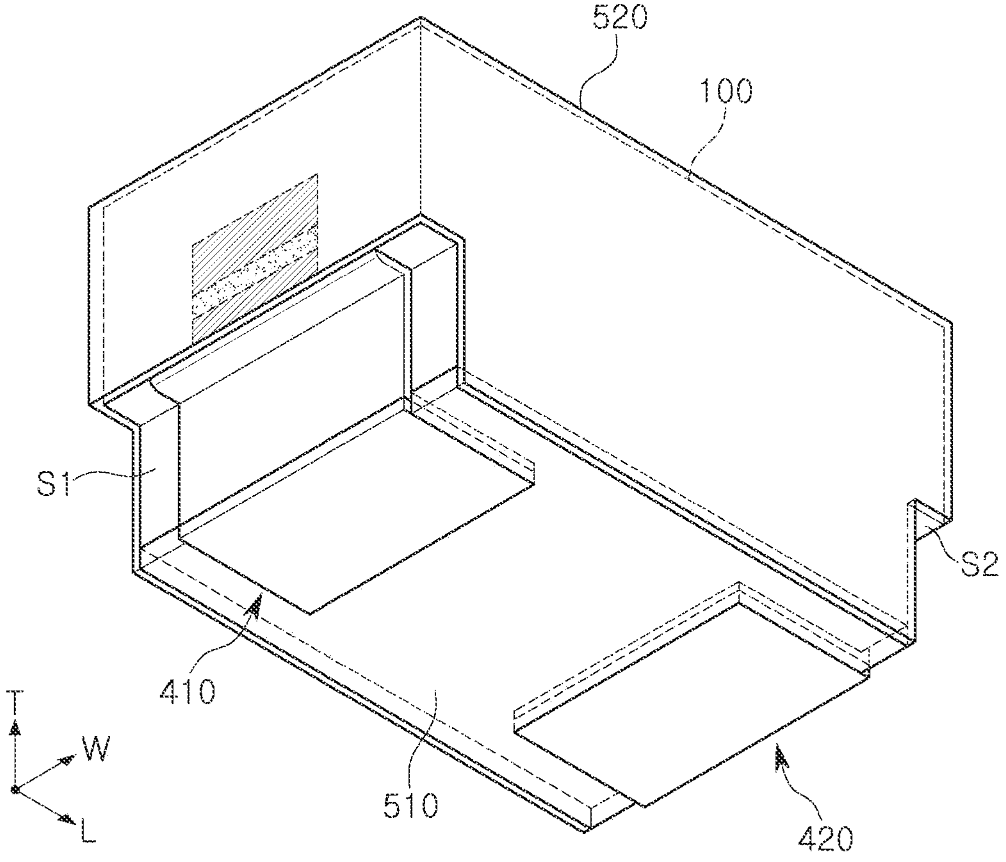
FIG. 3 is a view in which a portion is omitted from the perspective view of FIG. 2.
Figure 4:
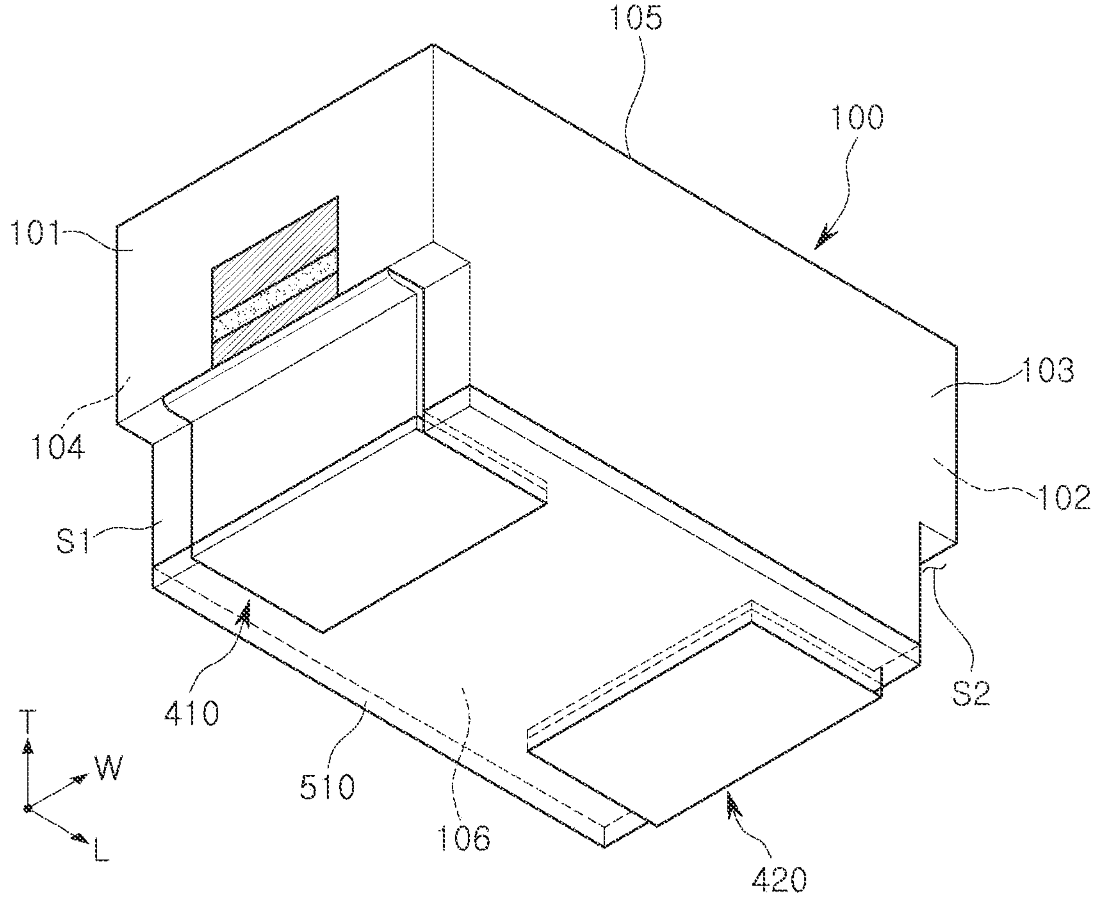
FIG. 4 is a view in which a portion is omitted from the perspective view of FIG. 3.
Figure 5:
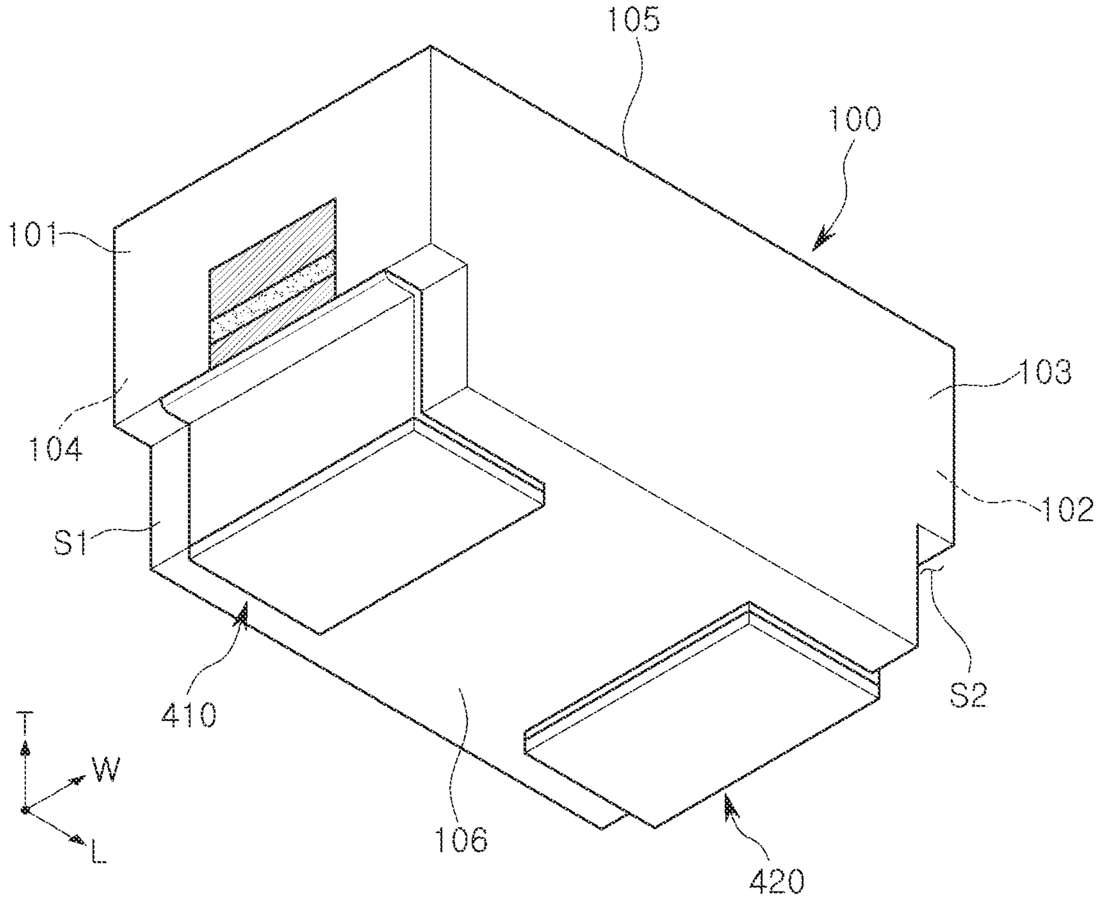
FIG. 5 is a view in which a portion is omitted from the perspective view of FIG. 4.
Figure 6:
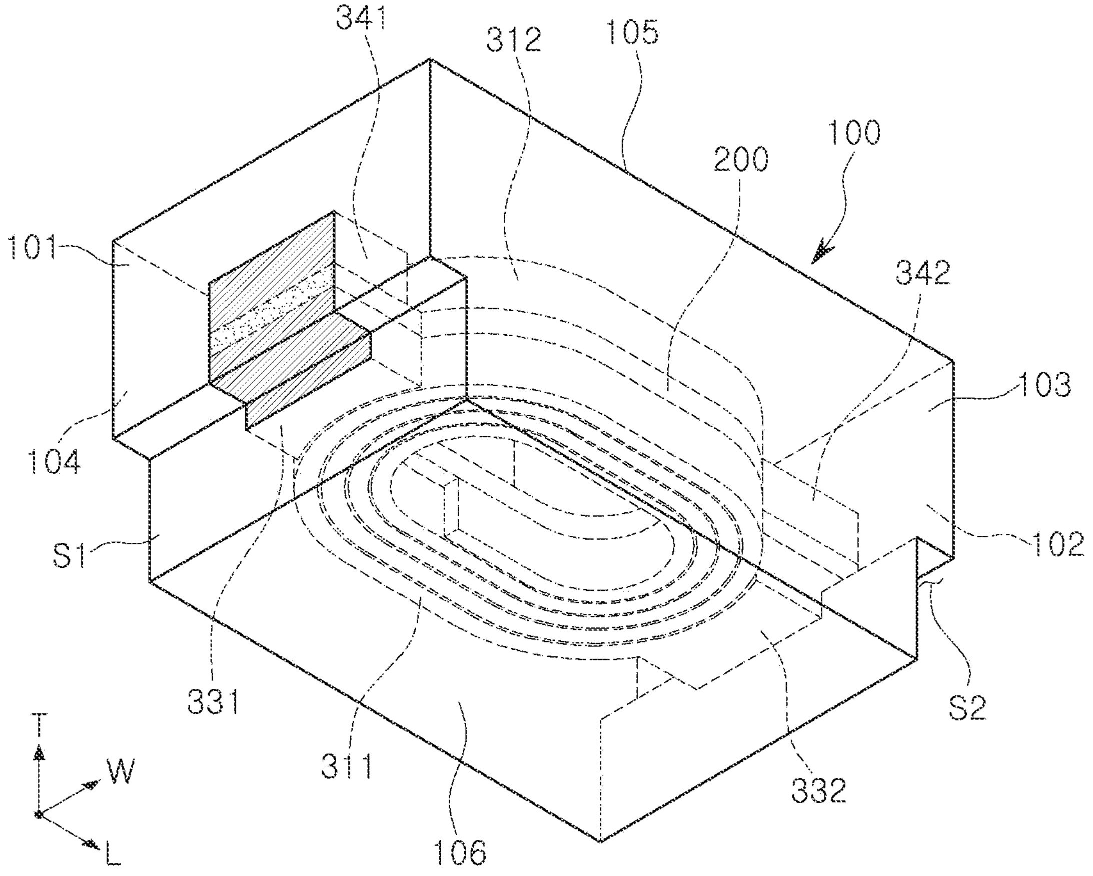
FIG. 6 is a view in which a portion is omitted from the perspective view of FIG. 5.
Figure 7:
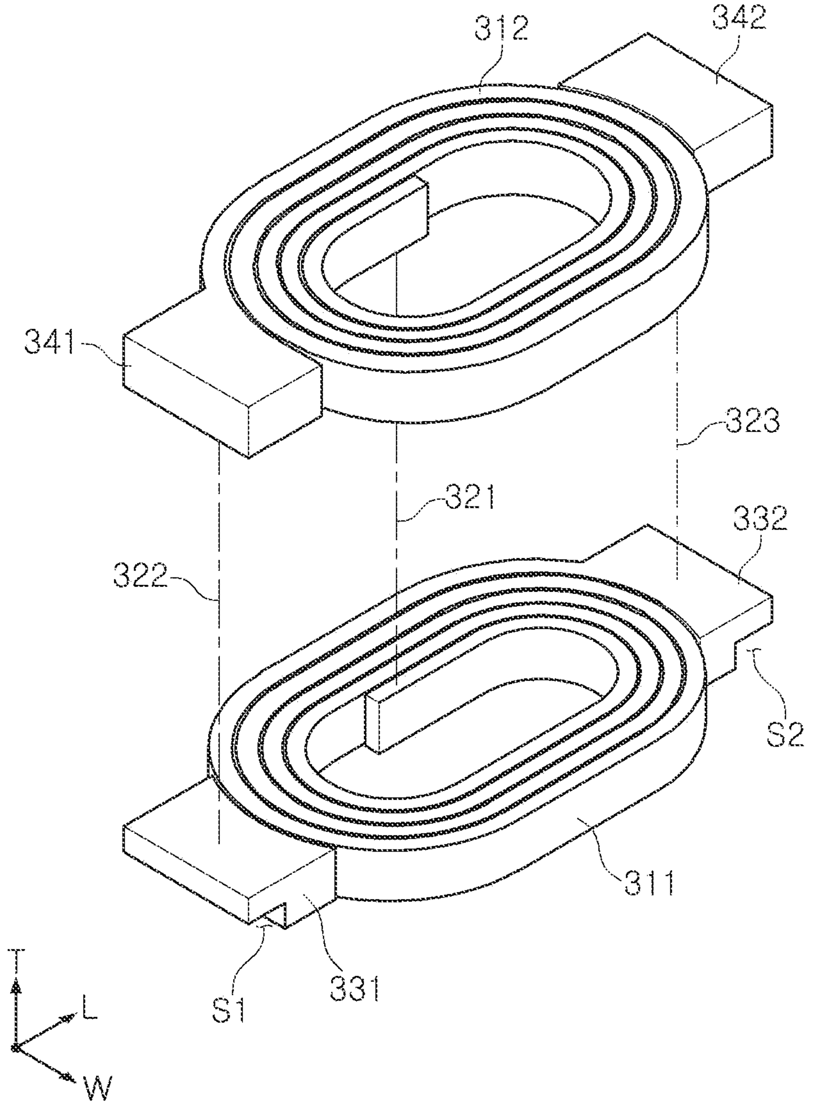
FIG. 7 is a view illustrating a schematic connection relationship of a coil portion.
Figure 8:
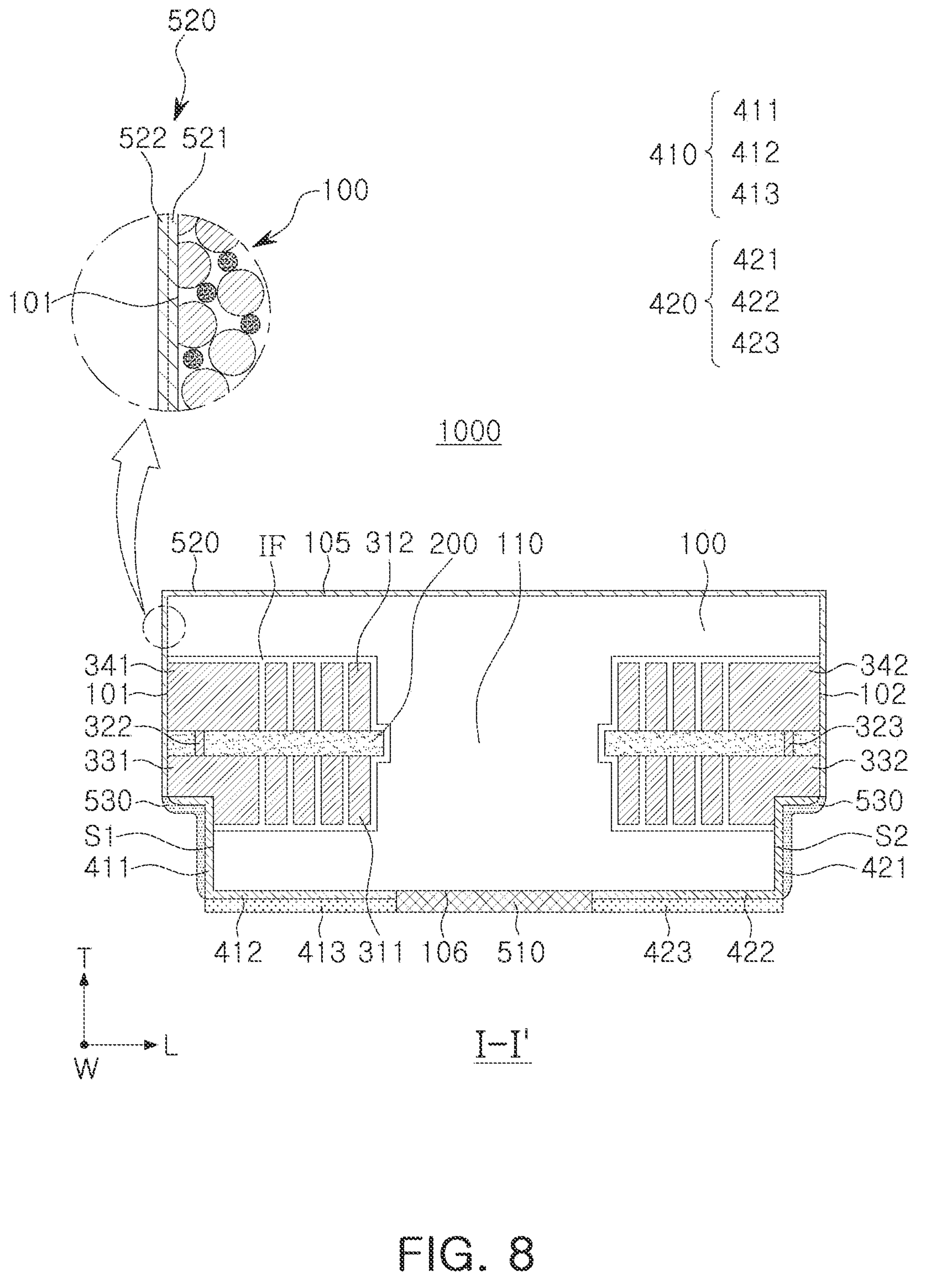
FIG. 8 is a cross-sectional view taken along line I-I' of FIG. 1.
Figure 9:
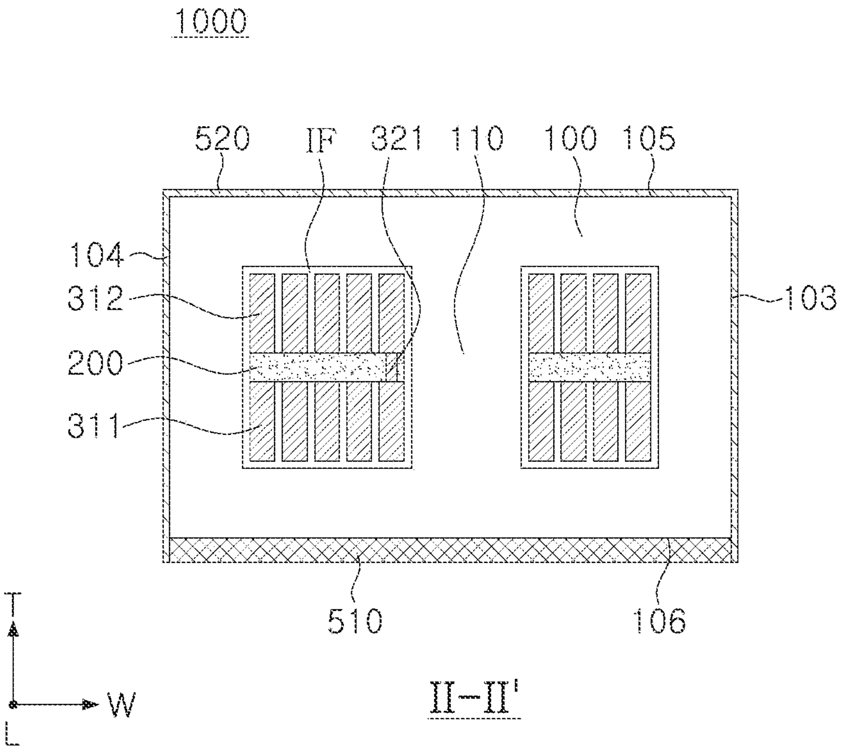
FIG. 9 is a cross-sectional view taken along line II-II' of FIG. 1.

FIG. 1 is a schematic perspective view of a coil component according to an exemplary embodiment. FIG. 2 is a perspective view of FIG. 1 when viewed from a lower side thereof. FIG. 3 is a view in which a portion is omitted from the perspective view of FIG. 2. FIG. 4 is a view in which a portion is omitted from the perspective view of FIG. 3. FIG. 5 is a view in which a portion is omitted from the perspective view of FIG. 4. FIG. 6 is a view in which a portion is omitted from the perspective view of FIG. 5. FIG. 7 is a view illustrating a schematic connection relationship of a coil portion. FIG. 8 is a cross-sectional view taken along line I-I' of FIG. 1. FIG. 9 is a cross-sectional view taken along line II-II' of FIG. 1. Specifically, FIG. 3 is a view in which a slit insulating layer is omitted from FIG. 2, FIG. 4 is a view in which a surface insulating layer is omitted from FIG. 3, FIG. 5 is a view in which a lower insulating layer is omitted from FIG. 4, and FIG. 6 is a view in which external electrodes are omitted from FIG. 5.

Referring to FIGS. 1 to 9, a coil component 1000 according to an exemplary embodiment may include a body 100, a support substrate 200, a coil portion 300, slit portions S1 and S2, external electrodes 410 and 420, and insulating layers 510, 520, and 530, and may further include an insulating film IF.

The body 100 may form an exterior of the coil component 1000, and may embed the support substrate 200 and the coil portion 300 therein.

The body 100 may be formed to have an overall hexahedral shape.

The body 100 has a first surface 101 and a second surface 102 opposing each other in a length direction L, a third surface 103 and a fourth surface 104 opposing each other in a width direction W, and a fifth surface 105 and a sixth surface 106 opposing each other in a thickness direction T, based on directions of FIGS. 1 to 6. Each of the first to fourth surfaces 101, 102, 103, and 104 of the body 100 may correspond to a wall surface of the body 100 connecting the fifth surface 105 and the sixth surface 106 of the body 100. Hereinafter, both end surfaces (one end surface and the other end surface) of the body 100 may refer to the first surface 101 and the second surface 102, respectively, and both side surfaces (one side surface and the other side surface) of the body 100 may refer to the third surface 103 and the fourth surface 104 of the body 100, respectively. In addition, one surface and a lower surface of the body 100 may refer to the sixth surface 106, and the other surface and an upper surface of the body 100 may refer to a fifth surface 105 of the body 100.

As an example, the body 100 may be formed in such a manner that the coil component 1000, including the external electrodes 410 and 420 and insulating layers 510, 520, and 530 to be described later, has a length of 2.0 mm, a width of 1.2 mm, and a thickness of 0.65 mm, but the present disclosure is not limited thereto.

The term "length of the coil component 1000" may refer to, based on a scanning electron microscope (SEM) image for a cross section, taken in a length-thickness (L-T) direction, in a central portion of the coil component in a width (W) direction, a maximum value, among lengths of a plurality of segments connecting outermost boundaries of the coil component, illustrated in the cross-sectional image, and parallel to the length (L) direction. Alternatively, the term "length of the coil component 1000" may refer to an arithmetic means of lengths of at least three segments, among lengths of a plurality of segments connecting outermost boundaries of the coil component 1000, illustrated in the cross-sectional image, and parallel to the length (L) direction.

The term "thickness of the coil component 1000" may refer to, based on a scanning electron microscope (SEM) image fora cross section, taken in a length-thickness (L-T) direction, in a central portion of the coil component in a width (W) direction, a maximum value, among lengths of a plurality of segments connecting outermost boundaries of the coil component, illustrated in the cross-sectional image, and parallel to the thickness (T) direction. Alternatively, the term “thickness of the coil component 1000” may refer to an arithmetic means of thicknesses of at least three segments, among a plurality of segments connecting outermost boundaries of the coil component 1000, illustrated in the cross-sectional image, and parallel to the thickness (T) direction.

The term “width of the coil component 1000” may refer to, based on a scanning electron microscope (SEM) image for a cross section, taken in a length-thickness (L-T) direction, in a central portion of the coil component in a width (W) direction, a maximum value, among lengths of a plurality of segments connecting outermost boundaries of the coil component, illustrated in the cross-sectional image, and parallel to the width (W) direction. Alternatively, the term“width of the coil component 1000” may refer to an arithmetic means of widths of at least three segments, among a plurality of segments connecting outermost boundaries of the coil component 1000, illustrated in the cross-sectional image, and parallel to the width (W) direction.

Alternatively, each of the length, the width, and the thickness of the coil component 1000 may be measured by a micrometer measurement method. In the micrometer measurement method, measurement may be performed by setting a zero point using a micrometer with gage repeatability and reproducibility (R&R), inserting the coil component 1000 between tips of the micrometer, and turning a measurement lever of the micrometer. When the length of the coil component 1000 is measured by a micrometer measurement method, the length of the coil component 1000 may refer to a value measured once or an arithmetic mean of values measured multiple times. This may be equivalently applied to the width and the thickness of the coil component 1000. Other methods and/or tools appreciated by one of ordinary skill in the art, even if not described in the present disclosure, may also be used.

The body 100 may include a magnetic material and a resin. Specifically, the body 100 may be formed by laminating at least one magnetic composite sheet in which a magnetic material is dispersed in a resin. However, the body 100 may have a structure other than the structure in which a magnetic material is dispersed in a resin. For example, the body 100 may be formed of a magnetic material such as ferrite.

The magnetic material may be ferrite or magnetic metal powder particles.

Examples of the ferrite powder particles may include at least one or more of spinel type ferrites such as Mg—Zn-based ferrite, Mn—Zn-based ferrite, Mn—Mg-based ferrite, Cu—Zn-based ferrite, Mg—Mn—Sr-based ferrite, Ni—Zn-based ferrite, and the like, hexagonal ferrites such as Ba—Zn-based ferrite, Ba—Mg-based ferrite, Ba—Ni-based ferrite, Ba—Co-based ferrite, Ba—Ni—Co-based ferrite, and the like, garnet type ferrites such as Y-based ferrite, and the like, and Li-based ferrites.

The magnetic metal powder particle may include one or more selected from the group consisting of iron (Fe), silicon (Si), chromium (Cr), cobalt (Co), molybdenum (Mo), aluminum (Al), niobium (Nb), copper (Cu), and nickel (Ni). For example, the magnetic metal powder particle may be at least one or more of a pure iron powder, a Fe—Si-based alloy powder, a Fe—Si—Al-based alloy powder, a Fe—Ni-based alloy powder, a Fe—Ni—Mo-based alloy powder, a Fe—Ni—Mo—Cu-based alloy powder, a Fe—Co-based alloy powder, a Fe—Ni—Co-based alloy powder, a Fe—Cr-based alloy powder, a Fe—Cr—Si-based alloy powder, a Fe—Si—Cu—Nb-based alloy powder, a Fe—Ni—Cr-based alloy powder, and a Fe—Cr—Al-based alloy powder.

The metallic magnetic powder particle may be amorphous or crystalline. For example, the magnetic metal powder particle may be a Fe—Si—B—Cr-based amorphous alloy powder, but is not limited thereto.

Each of the magnetic metal powder particles may have an average diameter of about 0.1 μm to 30 μm, but is not limited thereto.

The body 100 may include two or more types of magnetic metal powder particle dispersed in a resin. The term “different types of magnetic powder particle” means that the magnetic powder particles, dispersed in the resin, are distinguished from each other by at least one of average diameter, composition, crystallinity, and shape.

The resin may include epoxy, polyimide, liquid crystal polymer, or the like, in a single or combined form, but is not limited thereto.

The body 100 may have a core 110 penetrating through the coil portion 300 to be described later. The core 110 may be formed by filling a through-hole in the coil portion 300 with a magnetic composite sheet, but the present disclosure is not limited thereto.

The support substrate 200 may be disposed inside the body 100. The support substrate 200 may be configured to support the coil portion 300 to be described later.

The support substrate 200 may include an insulating material, for example, a thermosetting insulating resin such as an epoxy resin, a thermoplastic insulating resin such as polyimide, or a photosensitive insulating resin, or the support substrate 200 may include an insulating material in which a reinforcing material such as a glass fiber or an inorganic filler is impregnated with an insulating resin. For example, the support substrate 200 may include an insulating material such as prepreg, Ajinomoto Build-up Film (ABF), FR-4, a bismaleimide triazine (BT) film, a photo-imageable dielectric (PID) film, and the like, but are not limited thereto.

The inorganic filler may be at least one or more selected from the group consisting of silica ($SiO_2$), alumina ($Al_2O_3$), silicon carbide (SiC), barium sulfate ($BaSO_4$), talc, mud, a mica powder, aluminum hydroxide ($Al(OH)_3$), magnesium hydroxide ($Mg(OH)_2$), calcium carbonate ($CaCO_3$), magnesium carbonate ($MgCO_3$), magnesium oxide (MgO), boron nitride (BN), aluminum borate ($AlBO_3$), barium titanate ($BaTiO_3$), and calcium zirconate ($CaZrO_3$).

When the support substrate 200 is formed of an insulating material including a reinforcing material, the support substrate 200 may provide better rigidity. When the support substrate 200 is formed of an insulating material not including glass fibers, the support substrate 200 may be advantageous in thinning the entire coil component 1000. When the support substrate 200 is formed of an insulating material including a photosensitive insulating resin, the number of processes of forming the coil portion 300 may be reduced. Therefore, it may be advantageous in reducing production costs, and a fine via may be formed.

The support substrate 200 may have a thickness of, for example, 10 μm or more to 50 μm or less, but is not limited thereto.

The slit portions S1 and S2 may be formed on edge portions of the sixth surface 106 of the body 100. Specifically, the slit portions S1 and S2 may be formed along edge portions between the first surface 101 of the body 100 and the sixth surface 106 of the body 100 and between and the second surface 102 of the body 100 and the sixth surface 106 of the body 100, respectively. For example, the first slit portion S1 may be formed along the edge portion between the first surface 101 and the sixth surface 106 of the body 100, the second slit portion S2 may be formed along the edge portion between the second surface 102 and the sixth surface 106 of the body 100. The slit portions S1 and S2 may have a shape extending from the third surface 103 of the body 100 to the fourth surface 101 of the body 100. The slit portions S1 and S2 do not extend to the fifth surface 105 of the body 100. For example, the slit portions S1 and S2 do not penetrate through the body 100 in the thickness direction T of the body 100.

The slit portions S1 and S2 may be formed by performing pre-dicing on one surface of a coil bar along an imaginary boundary line matching a width direction of each coil component, among imaginary boundary lines individualizing each coil component, in a coil bar level, a state before each coil component is not individualized. The pre-dicing may adjust depths of the slit portions S1 and S2 such that lead-out patterns 331 and 332 to be described are exposed inwardly of the slit portions S1 and S2. Internal surfaces of the slit portions S1 and S2 may have internal walls, substantially parallel to the first and second surfaces 101 and 102 of the body 100, and bottom surfaces connecting the internal wall to the first and second surfaces 101 and 102 of the body 100. Hereinafter, for ease of description, the slit portions S1 and S2 will be described as having internal walls and lower surfaces, but the present disclosure is not limited thereto. As an example, the internal surface of the first slit S1 may be formed to have a curved shape, connecting the first surface 101 and sixth surface 106 of the body 100 to each other, in a cross-section taken in the length-thickness (L-T) direction, such that the internal wall and the lower surface may not be readily apparent.

The internal surfaces of the slit portions also correspond to surfaces of the body 100. However, for an understanding of the present disclosure and ease of description, the internal surfaces of the slit portions S1 and S2 will be distinguished from the first to sixth surfaces 101, 102, 103, 104, 105, and 106, the surfaces of the body 100.

The coil portion 300 may be embedded in the body 100 to exhibit characteristics of the coil component 1000. For example, when the coil component 1000 is used as a power inductor, the coil portion 300 may store an electric field as a magnetic field to maintain an output voltage, serving to stabilize a power supply of an electronic device.

The coil portion 300 may include coil patterns 311 and 312, vias 321, 322 and 323, lead-out patterns 331 and 332, and dummy lead-out patterns 341 and 342.

Referring to FIGS. 1, 7, 8, and 9, based on directions of FIGS. 8 and 9, the first coil pattern 311 and the lead-out patterns 331 and 332 may be disposed on a lower surface of the support substrate 200 facing the sixth surface 106 of the body 100, and the second coil pattern 312 and the dummy lead-out patterns 341 and 342 may be disposed on an upper surface of the support substrate 200 opposing the lower surface of the support substrate 200. On the lower surface of the support substrate 200, the first coil pattern 311 may be in direct contact with and connected to the second lead-out pattern 332, and each of the first coil pattern 311 and the second lead-out pattern 332 may be disposed to be spaced apart from the first lead-out pattern 331. The second lead-out pattern 332 may be formed to extend from an outermost turn of the first coil pattern 311. The first lead-out pattern 331 may be exposed to the first surface 101 of the body 100 and the internal surface of the first slit portion S1. The first lead-out pattern 331 may be continuously exposed to the first surface 101 of the body 100, the lower surface of the first slit portion S1, and the internal wall of the first slit portion S1. The second lead-out pattern 332 may be exposed to the second surface 102 of the body 100 and the internal surface of the second slit portion S2. The second lead-out pattern 332 may be continuously exposed to the second surface of the body 100, the lower surface of the second slit portion S2, and the internal wall of the second slit portion S2. On the upper surface of the support substrate 200, the second coil pattern 312 may be in direct contact with and connected to the first dummy lead-out pattern 341, and each of the second coil pattern 312 and the first dummy lead-out pattern 341 may be disposed to be spaced apart from the second dummy lead-out pattern 342. The first dummy lead-out pattern 341 may be formed to extend from an outermost turn of the second coil pattern 312. The first dummy lead-out pattern 341 may be exposed to the first surface 101 of the body 100. The second dummy lead-out pattern 342 may be exposed to the second surface 102 of the body 100. The first via 321 may penetrate through the support substrate 200 to be in contact with an innermost turn of the first coil pattern 311 and an innermost turn of the second coil pattern 312. The second via 322 may penetrate through the support substrate to connect the first lead-out pattern 331 and the first dummy lead-out pattern 341 to each other. The third via 323 may penetrate through the support substrate 200 to connect the second lead-out pattern 332 and the second dummy lead-out pattern 342 to each other. As a result, the coil portion 300 may serve as a single coil overall.

Each of the coil patterns 311 and 312 may have a planar spiral shape having at least one turn formed about the core 110. As an example, the first coil pattern 311 may form at least one turn about the core 110 on one surface of the support substrate 200.

The first lead-out pattern 331 and the second lead-out pattern 332 may be exposed to the lower surfaces and the internal walls of the slit portions S1 and S2. For example, the depths of the slit portions S1 and S2 may be adjusted to extend the slit portions S1 and S2 to at least a portion of the first and second lead-out patterns 331 and 332. One surface of each of the first and second lead-out patterns 331 and 332, exposed to the internal walls and the lower surfaces of the slit portions S1 and S2, may have higher surface roughness than another surface of each of the first and second lead-out patterns 331 and 332. As an example, when the first and second lead-out patterns 331 and 332 are formed by electroplating and then the slit portions S1 and S2 are formed on the first and second lead-out patterns 331 and 332 and the body 100, a portion of the first and second lead-out patterns 331 and 332 may be removed in a pre-dicing process for forming the slit portions S1 and S2. Accordingly, one surface of each of the first and second external patterns 331 and 332, exposed to the internal walls and the lower surfaces of the slit portions S1 and S2, may have higher surface roughness than the other surfaces of each of the first and second lead-out patterns 331 and 332 due to polishing of a pre-dicing tip. The external electrodes 410 and 420 to be described later may be formed on the first and second lead-out patterns 331 and 332, exposed to the lower surfaces and the internal walls of the slit portions S1 and S2, to connect the coil portion 300 and the external electrodes 410 and 420 to each other. Each of the external electrodes 410 and 420 may be formed as a thin film to deteriorate coupling force to the first and second lead-out patterns 331 and 332. However, since the external electrodes 410 and 420 are in contact with and, connected to, the one surface of each of the second lead-out patterns 331 and 332 having relatively high surface roughness, coupling force between the external electrodes 410 and 420 and the first and second lead-out patterns 331 and 332 may be increased. As a result, coupling reliability between the coil portion 300 and the external electrodes 410 and 420 may be improved.

At least one of the coil patterns 311 and 312, the vias 321, 322, and 323, the lead-out patterns 331 and 332, and the dummy lead-out patterns 341 and 342 may include one or more conductive layers. As an example, when the first coil pattern 311, the lead-out patterns 331 and 332, and the vias 321, 322, and 323 are formed on the lower surface side of the support substrate 200 by plating, each of the first coil pattern 311, the lead-out patterns 331 and 332, and the vias 321, 322, and 323 may include a first conductive layer, formed by electroless plating or the like, and a second conductive layer disposed on the first conductive layer. The first conductive layer may be a seed layer for forming a second conductive layer on the support substrate 200 by plating. The second conductive layer may be an electroplating layer. In this case, the electroplating layer may have a single-layer structure or a multilayer structure. A multilayer electroplating layer may be formed to have a conformal structure in which one electroplating layer covers another electroplating layer, or may be formed to have a shape in which one electroplating layer is laminated on only one surface of another electroplating layer. A seed layer of the first coil pattern 311 and a seed layer of the second lead-out pattern 332 may be formed to be integrated with each other such that a boundary therebetween may not be formed, but the present disclosure is not limited thereto.

As an example, each of the coil patterns 311 and 312, the lead-out patterns 331 and 332, and the dummy lead-out patterns 341 and 342 may be formed to protrude from the lower surface and the upper surface of the support substrate 200, as illustrated in FIGS. 8 and 9. As another example, the first coil pattern 311 and the lead-out patterns 331 and 332 may be formed to protrude from the lower surface of the support substrate 200, and the second coil pattern 312 and the dummy lead-out patterns 341 and 342 may be embedded in the upper surface of the support substrate 200 to expose upper surfaces of the second coil pattern 312 and the dummy lead-out patterns 341 and 342 to the upper surface of the support substrate 200. In this case, a concave portion may be formed on at least one of the upper surface of the second coil pattern 312 and the upper surfaces of the dummy lead-out patterns 341 and 342, so that the upper surface of the support substrate 200 and the upper surface of the second coil pattern 312 and/or the upper surfaces of the dummy lead-out patterns 341 and 342 may not be coplanar with each other.

Each of the coil patterns 311 and 312, the vias 321, 322, and 323, the lead-out patterns 331 and 332, and the dummy lead-out patterns 341 and 342 may be formed of a conductive material such as copper (Cu), aluminum (Al), silver (Ag), tin (Sn), gold (Au), nickel (Ni), lead (Pb), titanium (Ti), or alloys thereof, but the conductive material is not limited thereto.

Figure 10:
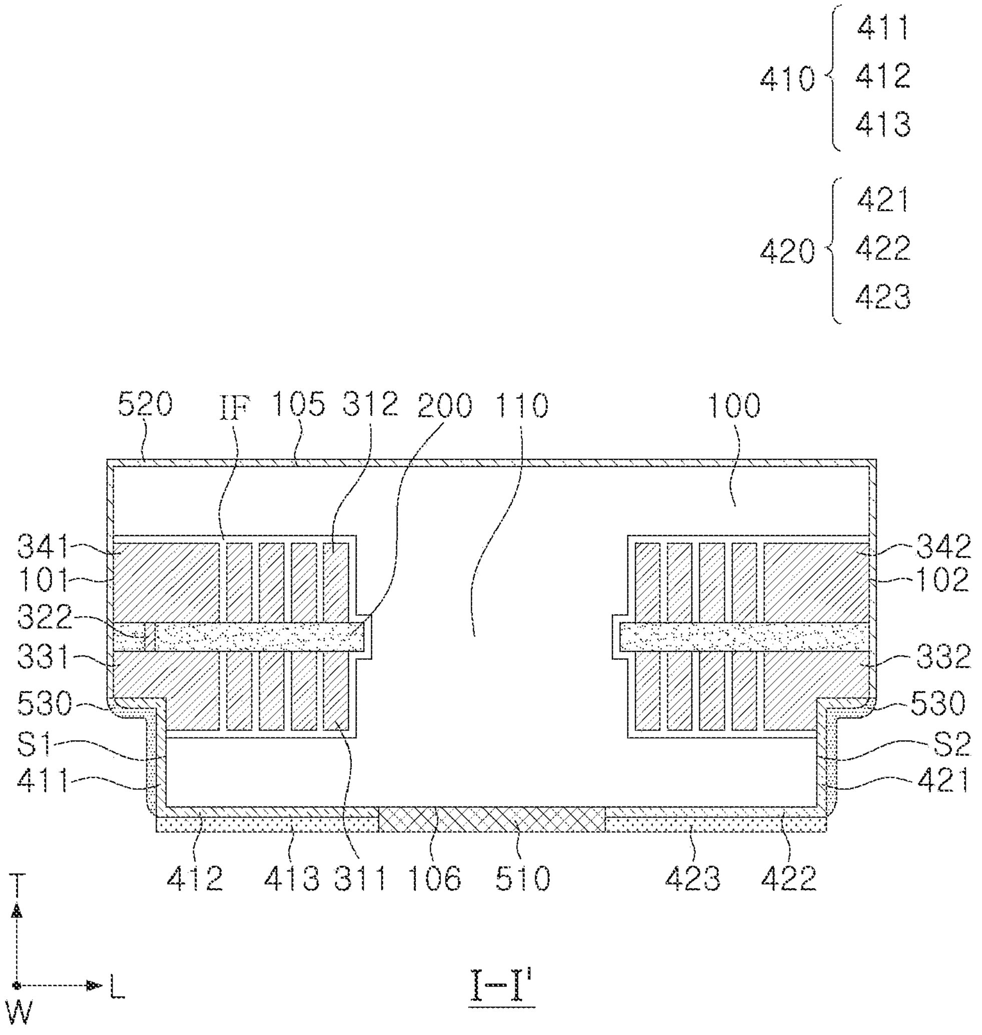
FIG. 10 is a view illustrating a modified example corresponding to FIG. 8.
Figure 11:
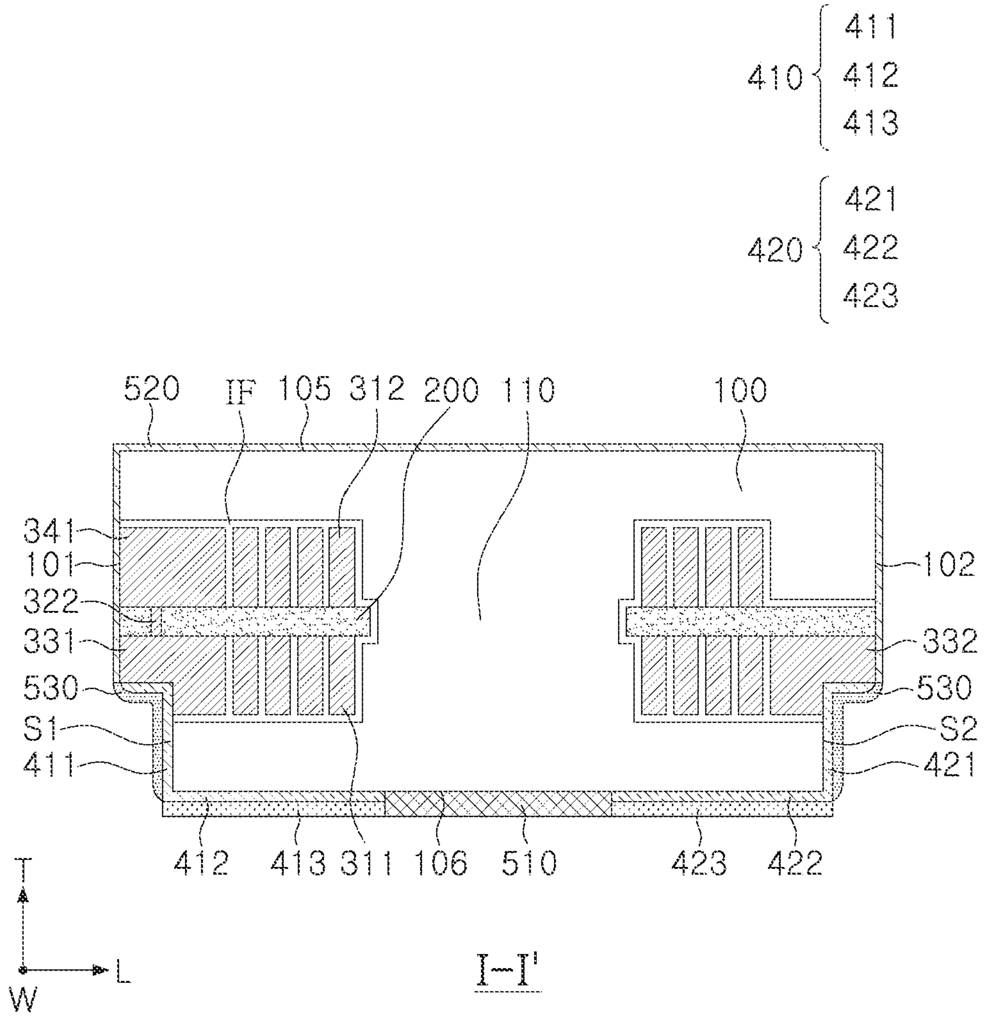
FIG. 11 is a view illustrating another modified example corresponding to FIG. 8.

FIG. 10 is a view illustrating a modified example corresponding to FIG. 8. FIG. 11 is a view illustrating another modified example corresponding to FIG. 8. Referring to FIGS. 7, 10, and 11, the second dummy lead-out pattern 342 of the present embodiment is irrelevant to electrical connection between the other elements of the coil portion 300, and thus, the second dummy lead-out pattern 342 and/or the third via 323 may be omitted.

For example, referring to FIG. 10, in a modified example of the present embodiment, the third via 323 may be omitted, so that the second lead-out pattern 332 and the second dummy lead-out pattern 342 may not be directly connected to each other. In this modified example, the second dummy lead-out pattern 342, irrelevant to the electrical connection of the coil portion 300, may not be electrically connected to another element of the coil portion 300. In this modified example, warpage of the support substrate 200, which may occur when the second dummy lead-out pattern 342 is removed, may be prevented. Referring to FIG. 11, in another modified example of the present embodiment, the second dummy lead-out pattern 342 may be additionally omitted, as compared with the modified example illustrated in FIG. 10. In this case, a volume of the magnetic material in the body 100 may be increased by a volume corresponding to the second dummy lead-out pattern 342.

Figure 12:
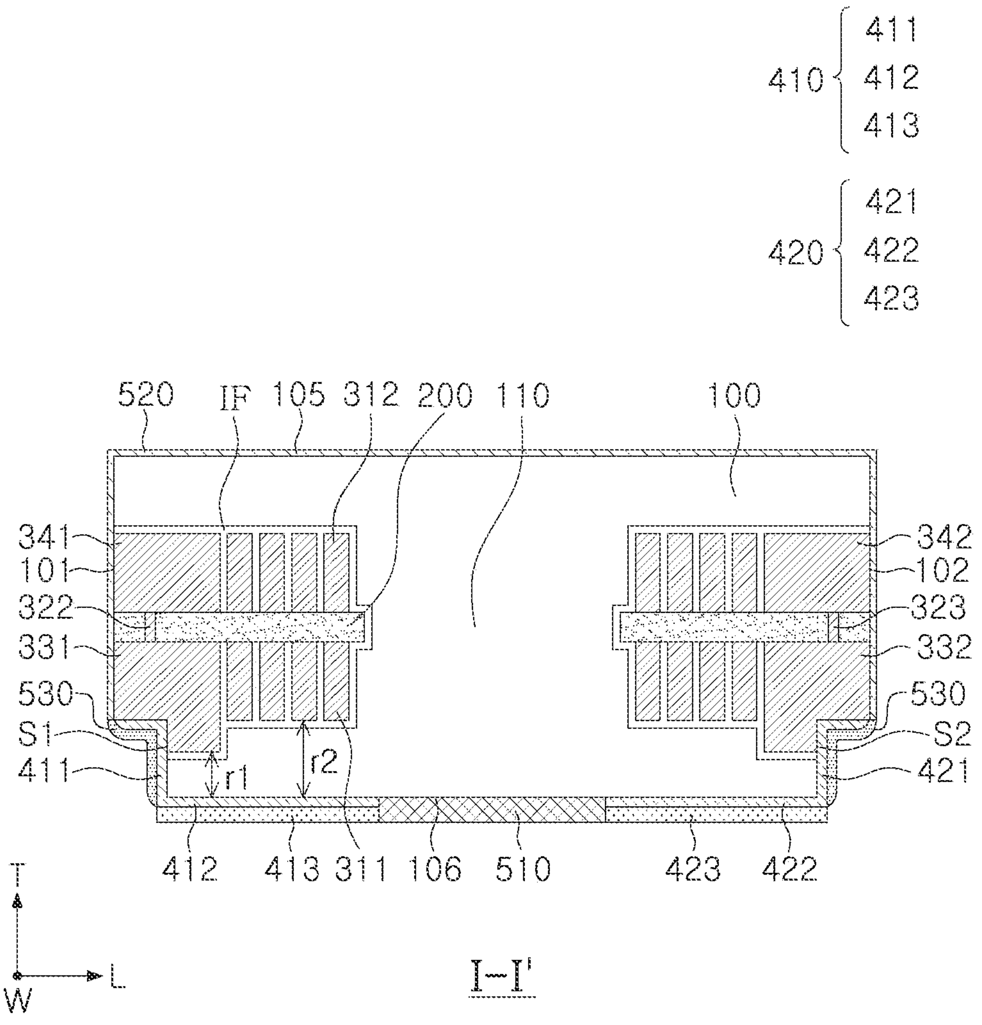
FIG. 12 is view illustrating another modified example corresponding to FIG. 8.

FIG. 12 is view illustrating another modified example corresponding to FIG. 8. The lead-out patterns 331 and 332 of the present embodiment may be exposed to internal surfaces of slit portions S1 and S2. In this modified example, each of the lead-out patterns 331 and 332 may have a thickness greater than a thickness of the first coil pattern 311.

Referring to FIG. 12, as an example, the first lead-out pattern 331 may be formed to have a thickness greater than a thickness of the first coil pattern 311, so that a distance r1 from the first lead-out pattern 331 to the sixth surface 106 of the body 100 is less than a distance r2 from the first coil pattern 311 to the sixth surface 106 of the body 100. In this modified example, each of the lead-out patterns 331 and 332 may be formed to have a thickness greater than the thickness of the first coil pattern 311, so that a processing depth of each of the slit portions S1 and S2 for exposing the lead-out patterns 331 and 332 to an external entity may be reduced. Therefore, a volume of a magnetic material removed in the processing of the slit portions S1 and S2 may be reduced to increase an effective volume of the magnetic material. In this modified example, the thickness of each of the lead-out patterns 331 and 332 may refer to a thickness of a region of each of the lead-out patterns 331 and 332 in which the slit portions S1 and S2 do not extend. In addition, the distance from each of the lead-out patterns 331 and 332 to the sixth surface 106 of the body 100 may refer to a distance from a region of each of the lead-out patterns 331 and 332, in which the slit portions S1 and S2 do not extend, to the sixth surface 106 of the body 100.

External electrodes 410 and 420 may be disposed to be spaced apart from each other on one surface 106 of the body 100, and may extend to the first and second slit portions S1 and S2 to be connected the first and second lead-out patterns 331 and 332, respectively. Specifically, the first external electrode 410 may have a first connection portion 411, disposed on a lower surface and an internal wall of the first slit S1 to be in contact with and connected to the first lead-out pattern 331 exposed to the lower surface and the internal wall of the first slit portion S1, and a first portion 412 extending from the first connection portion 411 to the sixth surface 106 of the body 100. The second external electrode 420 may have a second connection portion 421, disposed on the lower surface and the internal wall of the second slit portion S2 to be in contact with and connected to the second lead-out pattern 332 exposed to the lower surface and the internal wall of the second slit portion S2, and a second pad portion 422 extending from the second connection portion 421 to the sixth surface 106 of the body 100. The first pad portion 412 and the second pad portion 422 may be disposed to be spaced apart from each other on the sixth surface 106 of the body 100.

The connection portions 411 and 421 may be disposed in central portions of internal surfaces of the slit portions S1 and S2 in a width direction W. The pad portions 412 and 422 may be disposed in a central portion of the sixth surface of the body 100 in the width direction W. For example, each of the connection portions 411 and 421 and the pad portions 412 and 422 may not extend to the third and fourth surfaces 103 and 104 of the body 100. In FIGS. 1 to 6, lengths of the connection portions 411 and 421 in the width direction W and lengths of the pad portions 412 and 422 in the width direction W are illustrated as being the same, but this is only an example. Therefore, the range of the present disclosure is not limited to what is illustrated in FIGS. 1 to 6. As an example, the length of each of the pad portions 412 and 422 in the width direction W may be greater than the length of each of the connection portions 411 and 421 in the width direction W.

Each of the external electrodes 410 and 420 may be formed along each of the internal surface of the slit portions S1 and S2 and the sixth surface 106 of the body 100. For example, each of the external electrodes 410 and 420 may be formed to have a shape of a film conformal on the internal surface of each of the slit portions S1 and S2 and the sixth surface 106 of the body 100. Each of the external electrodes 410 and 420 may be formed to be integrated with the internal surface of each of the slit portions S1 and S2 on the sixth surface 106 of the body 100. To this end, the external electrodes 410 and 420 may be formed by a thin film process such as a sputtering process or a plating process.

The external electrodes 410 and 420 may be formed of a conductive material such as copper (Cu), aluminum (Al), silver (Ag), tin (Sn), gold (Au), nickel (Ni), lead (Pb), chromium (Cr), titanium (Ti), or alloys thereof, but the conductive material is not limited thereto.

Each of the external electrodes 410 and 420 may be formed to have a multilayer structure. As an example, each of the external electrodes 410 and 420 may include a first layer, including copper (Cu), and a second layer 413 disposed on the first layer. The first layers may have connection portions 411 and 421 and the pad portions 421 and 422. The second layers 413 and 423 may be disposed on the pad portions 421 and 422, and may be formed to have a single-layer structure or a multilayer structure. When the second layers 413 and 423 have a multilayer structure, the second layers 413 and 423 may include a first conductive layer, including nickel (Ni), and a second conductive layer including tin (Sn). The first layers may be formed by electroplating or vapor deposition such as sputtering, or by applying and curing a conductive paste including conductive power particles such as copper (Cu) and/or silver (Ag). The second layers 413 and 423 may be formed by electroplating.

The lower insulating layer 510 may be disposed on the sixth surface of the body 100. The lower insulating layer 510 may cover the sixth surface 106 of the body 100, other than regions in which the pad portions 412 and 422 of the external electrodes 410 and 420 are disposed. The lower insulating layer 510 may be a plating resist used in plating formation of the external electrodes 410 and 420. The lower insulating layer 510 may be formed by forming an insulating material for forming a lower insulating layer 510 on the entire six surface 106 of the body 100 and then removing portions corresponding to the regions in which the pad portions 412 and 422 of the external electrodes 410 and 420 are disposed. Alternatively, the lower insulating layer 510 may be formed by selectively forming an insulating material for forming the lower insulating layer 510 in a region of the sixth surface 106 of the body 100, other than the regions in which the pad portions 412 and 422 are disposed. The lower insulating layer 510 may include an insulating resin such as epoxy.

A surface insulating layer 520 may be disposed on the first and second surfaces 101 and 102 of the body 100, and may include a first insulating thin film 521, including, for example, silicon dioxide ($SiO_2$), and a second insulating thin film 522 including, for example, aluminum oxide ($Al_2O_3$).

The surface insulating layer 520 may cover regions, exposed to the first and second surfaces 101 and 102 of the body 100, in the lead-out patterns 331 and 332. Accordingly, the surface insulating layer 520 may prevent short-circuits with another electronic component, mounted to be adjacent to the coil component 1000 according to the present embodiment, when the coil component 1000 is mounted on a mounting board such as a printed circuit board (PCB). The surface insulating layer 520 may have a thickness of 5 μm or less. The surface insulating layer 520 may have a thickness of, in more detail, 3 μm or less. When the thickness of the surface insulating layer 520 is greater than the above range, productivity may be reduced, a size of the overall component may be increased, or an effective volume of a magnetic material may be reduced based on a component of the same size. The term "thickness of the surface insulating layer 520" may refer to, based on an optical microscope or scanning electron microscope (SEM) image for a cross sectional in a length-thickness (L-T) direction in a central portion of the coil component 1000 in a width (W) direction, a maximum value, among lengths of a plurality of segments connecting an internal boundary line, corresponding to an internal surface of the surface insulating layer 520 in contact with the first surface 101 of the body 100 illustrated in the cross-sectional image, and an external boundary line, corresponding to an external surface of the surface insulating layer 520, to each other and parallel to the length (L) direction. Alternatively, the term "thickness of the surface insulating layer 520" may refer to an arithmetic means of at least three lengths, among lengths of a plurality of segments connecting an internal boundary line and an external boundary line of the surface insulating layer 520, illustrated in the cross-sectional image, and parallel to the length (L) direction.

Each of the first and second insulating thin films 521 and 522 may be formed by performing vapor deposition (VD), such as chemical vapor deposition (CVD), on the first and second surfaces 101 and 102 of the body 100. The first insulating thin film 521 may be formed to be in contact with each of the first and second surfaces 101 and 102 of the body 100. The first insulating thin film 521 may prevent the external electrodes 410 and 420 from being formed to extend to the first and second surfaces 101 and 102 of the body 100 when the external electrodes 410 and 420 are plating-formed on the internal surfaces of the slit portions S1 and S2 and the sixth surface 106 of the body 100. The second insulating thin film 522 may be disposed on the first insulating thin film 521. The second insulating thin film may prevent moisture from permeating into the body 100. Each of the first and second insulating thin films 521 and 522 may have a thickness of 3 μm or less. In the related art, a surface insulating layer formed on a surface of a body is formed through a thick-film process in which an insulating paste is printed, so that the surface insulating layer has a great thickness. In the present disclosure, the surface insulating layer 520, that is, the first and second insulating thin films 521 and 522 may be formed by a thin-film process to increase an effective volume of the body 100 and an effective volume of the magnetic material, as compared with a component having the same size. Each of the first and second insulating thin films 521 and 522 may be further disposed on each of the third and fifth surfaces 103, 104, and 105 of the body 100. That is, as an example, the first insulating thin film 521 may be disposed on each of the first to fifth surfaces 101, 102, 103, 104, and 105 of the body 100. In this case, the first insulating thin film 521 may be formed to be integrated with the first to fifth surfaces 101, 102, 103, 104, and 105 of the body 100. When the first insulating thin film 521 is formed in the state in which the lower insulating layer 510 is formed on the sixth surface 106 of the body 100, the first insulating thin film 521 may be formed to have a shape covering both side surfaces of the lower insulating layer 510 disposed on the same plane as the third and fourth surfaces 103 and 104 of the body 100, but the scope of the present disclosure is not limited thereto.

Slit insulating layers 530 may be disposed on the slit portions S1 and S2 to cover the connection portions 411 and 421 of the first and second external electrodes 410 and 420, respectively. The slit insulating layers 530 may cover the connection portions 411 and 421 to prevent short-circuit between the coil component 1000 according to the present embodiment and another electronic component.

The slit insulating layers 530 may be formed by forming an insulating material for the slit insulating layers 530 in the slit portions S1 and S2, in which the connection portions 411 and 421 are formed, using a printing method, vapor deposition, a spray coating method, a film lamination method, or the like, but the present is not limited thereto. The slit insulating layers 530 may include a thermoplastic resin such as a polystyrene-based resin, a vinyl acetate-based resin, a polyester-based resin, a polyethylene-based resin, a polypropylene-based resin, a polyamide-based resin, a rubber-based resin, or an acrylic-based resin, a thermosetting resin such as a phenol-based resin, an epoxy-based resin, a urethane-based resin, a melamine-based resin, or an alkyd-based resin, a photosensitive resin, parylene, $SiO_x$, or $SiN_x$. Each of the slit insulating layers 530 may be formed to have a relatively small thickness to have a shape corresponding to each of the slit portions S1 and S2. For example, each of the slit insulating layers 530 may be a conformal insulating layer.

Figure 13:
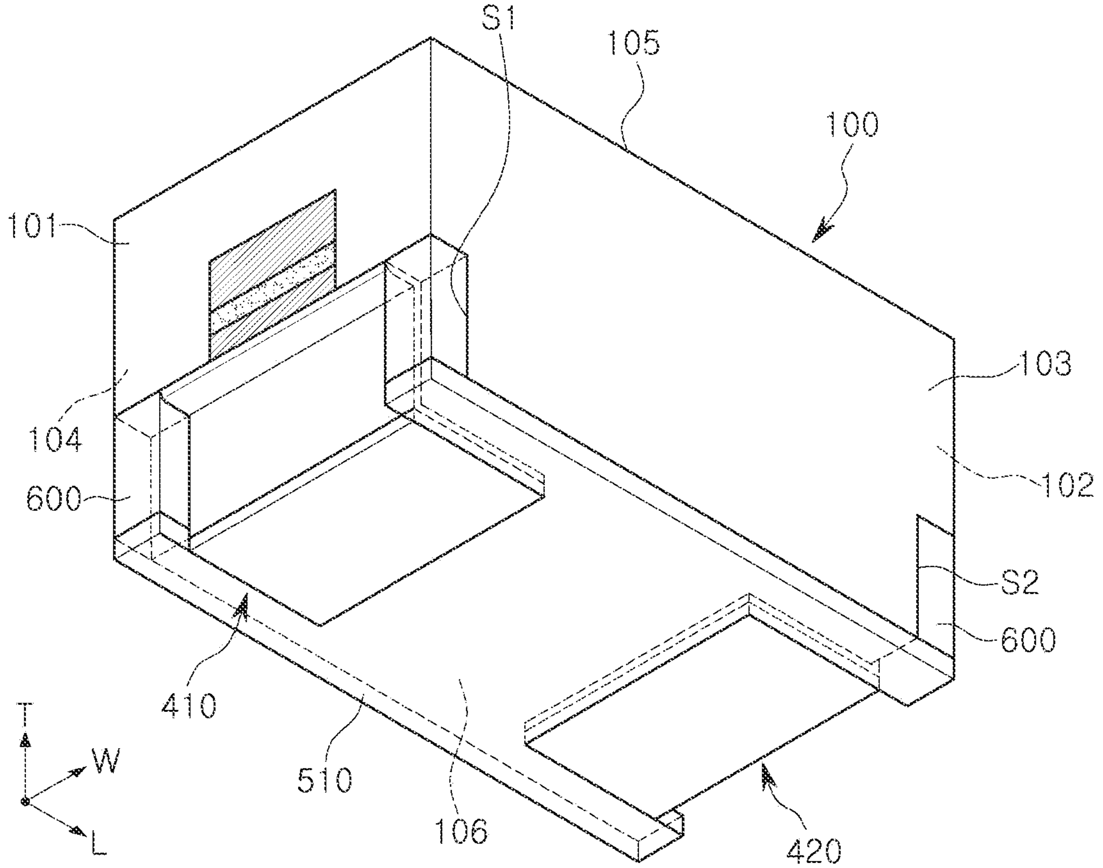
FIG. 13 is view illustrating another modified example corresponding to FIG. 4.

FIG. 13 is view illustrating another modified example corresponding to FIG. 4.

In this modified example, filling portions 600 may be further provided. The filing portions 600 may be disposed in regions, in which the connection portions 411 and 421 are not disposed, in internal surfaces of the slit portions S1 and S2. That is, as an example, the filling portions 600 may be disposed to have structures spaced apart from each other on the internal surface of the first slit portion S1 in a width direction W. A first connection portion 411 may be disposed between the filling portions 600 spaced apart from each other in the width direction, for example, in a central portion of an internal surface of the first slit portion S1 in the width direction W.

In this modified example, the connection portions 411 and 421 may be disposed in a central portion of the body 100 in the width direction W, in the internal surfaces of the slit portions S1 and S2, to achieve connection between the coil portion 300 and the external electrodes 410 and 420, and the filling portion 600 may be disposed in the region in which the connection portions 411 and 421 are not disposed, in the internal surfaces of the slit portions S1 and S2, to prevent plating bleeding during formation of the connection portions 411 and 421. In addition, the filling portion 600 may fill at least a portion of the internal surfaces of the slit portions S1 and S2 to significantly reduce insufficient formation of the surface insulating layer 520.

One surface of the filling portion 600 may be disposed to be substantially coplanar with the first and second surfaces 101 and 102, both end surfaces of the body 100, and the third and fourth surfaces 103 and 104, both side surfaces of the body 100.

The filling portion 600 may include an insulating resin. The insulating resin may include epoxy, polyimide, liquid crystal polymer, or the like, in a single or combined form, but is not limited thereto.

The filling portion 600 may further include magnetic powder particles dispersed in the insulating resin. The magnetic powder particles may be ferrite or magnetic metal powder particles.

Examples of the ferrite powder particles may include at least one or more of spinel type ferrites such as Mg—Zn-based ferrite, Mn—Zn-based ferrite, Mn—Mg-based ferrite, Cu—Zn-based ferrite, Mg—Mn—Sr-based ferrite, Ni—Zn-based ferrite, and the like, hexagonal ferrites such as Ba—Zn-based ferrite, Ba—Mg-based ferrite, Ba—Ni-based ferrite, Ba—Co-based ferrite, Ba—Ni—Co-based ferrite, and the like, garnet type ferrites such as Y-based ferrite, and the like, and Li-based ferrites.

The magnetic metal powder particle may include one or more selected from the group consisting of iron (Fe), silicon (Si), chromium (Cr), cobalt (Co), molybdenum (Mo), aluminum (Al), niobium (Nb), copper (Cu), and nickel (Ni). For example, the magnetic metal powder particle may be at least one or more of a pure iron powder, a Fe—Si-based alloy powder, a Fe—Si—Al-based alloy powder, a Fe—Ni-based alloy powder, a Fe—Ni—Mo-based alloy powder, a Fe—Ni—Mo—Cu-based alloy powder, a Fe—Co-based alloy powder, a Fe—Ni—Co-based alloy powder, a Fe—Cr-based alloy powder, a Fe—Cr—Si-based alloy powder, a Fe—Si—Cu—Nb-based alloy powder, a Fe—Ni—Cr-based alloy powder, and a Fe—Cr—Al-based alloy powder.

The metallic magnetic powder particle may be amorphous or crystalline. For example, the magnetic metal powder particle may be a Fe—Si—B—Cr-based amorphous alloy powder, but is not limited thereto.

Each of the magnetic metal powder particles 10 may have an average diameter of about 0.1 μm to 30 μm, but is not limited thereto.

Although not illustrated, in this modified example, a slit insulating layer 530 may be formed after the filling portion 600 is formed. Therefore, the slit insulating layer 530 may cover the filling portion 600 and the connection portions 411 and 421.

An insulating film IF may insulates coil patterns 311 and 312, lead-out patterns 331 and 332, and dummy lead-out patterns 341 and 342 from the body 100. The insulating film IF may include, for example, parylene, but the present disclosure is not limited thereto. The insulating film IF may be formed by a method such as vapor deposition, but the present is not limited thereto and the insulating film IF may be formed by laminating an insulating film on both surfaces of the support substrate 200. The insulating film IF may have a structure including a portion of a plating resist used to form the coil portion 300 using electroplating, but the present disclosure is not limited thereto.

Therefore, the coil component 1000 according to the present embodiment may easily implement a lower electrode structure while decreasing in size. Unlike the related art, for example, the external electrodes 410 and 420 are not formed to protrude from both end surfaces 101 and 102 or both side surfaces 103 and 104 of the body 100, and thus, overall length and width of the coil component 1000 are not increased. In addition, since each of the external electrodes 410 and 420 are formed by a thin-film process to have a relatively small thickness, an increase in the thickness of the coil component may be significantly reduced. In addition, the surface insulating layer 520 is formed to have a relatively small thickness thin through the thin-film process, the coil component 1000 according to the present embodiment may significantly increase an effective volume of a magnetic material.

ANOTHER EMBODIMENT

Figure 14:
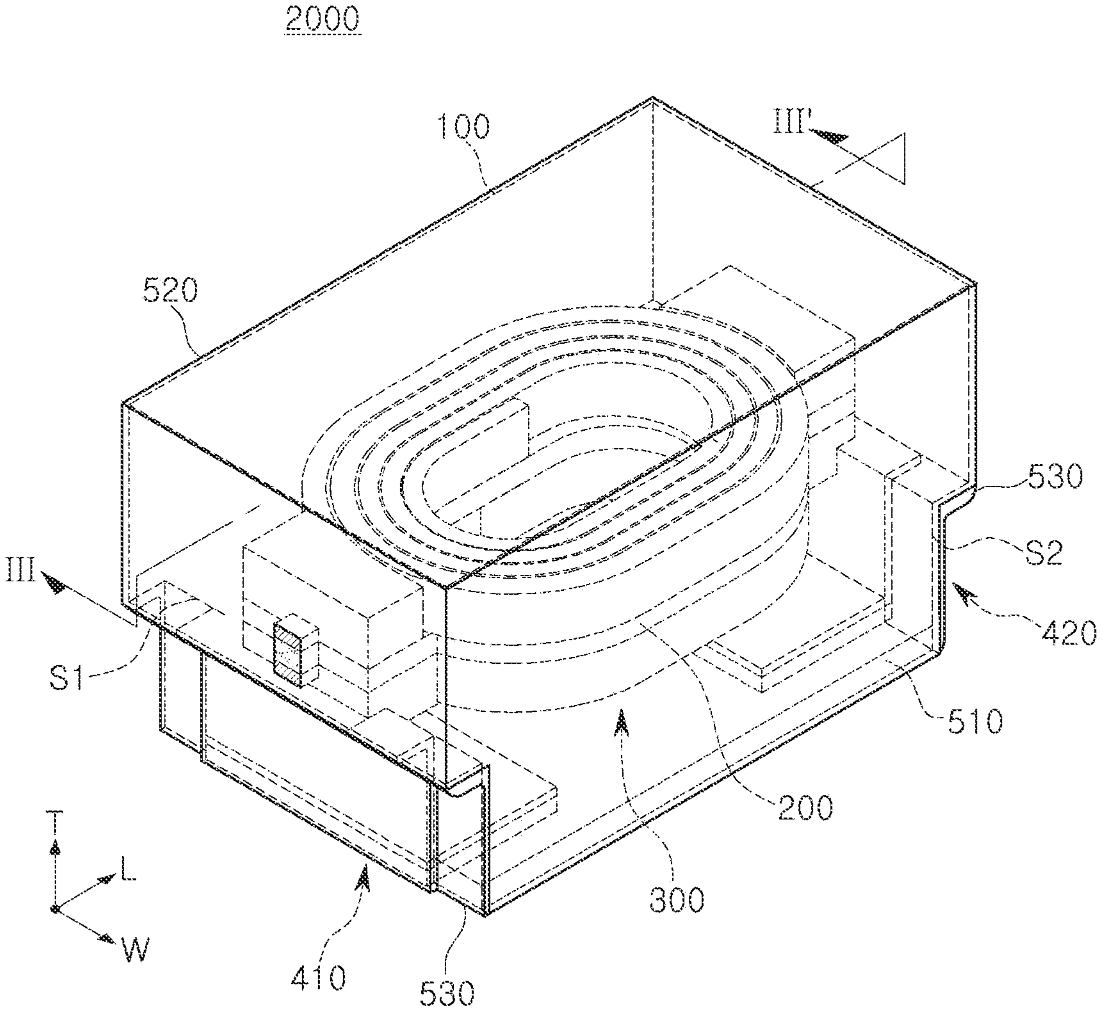
FIG. 14 is a schematic perspective view of a coil component according to another exemplary embodiment of the present disclosure.
Figure 15:
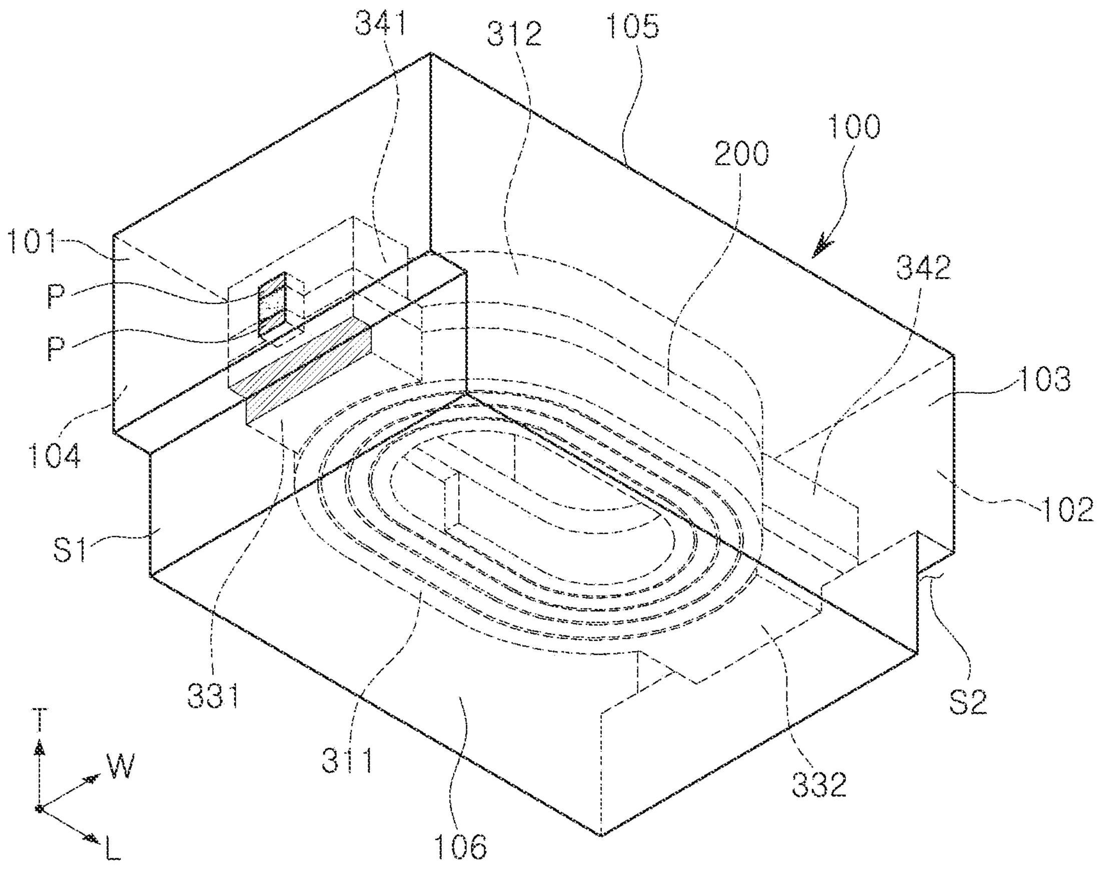
FIG. 15 is a view in which a portion is omitted from the perspective view of FIG. 14.
Figure 16:
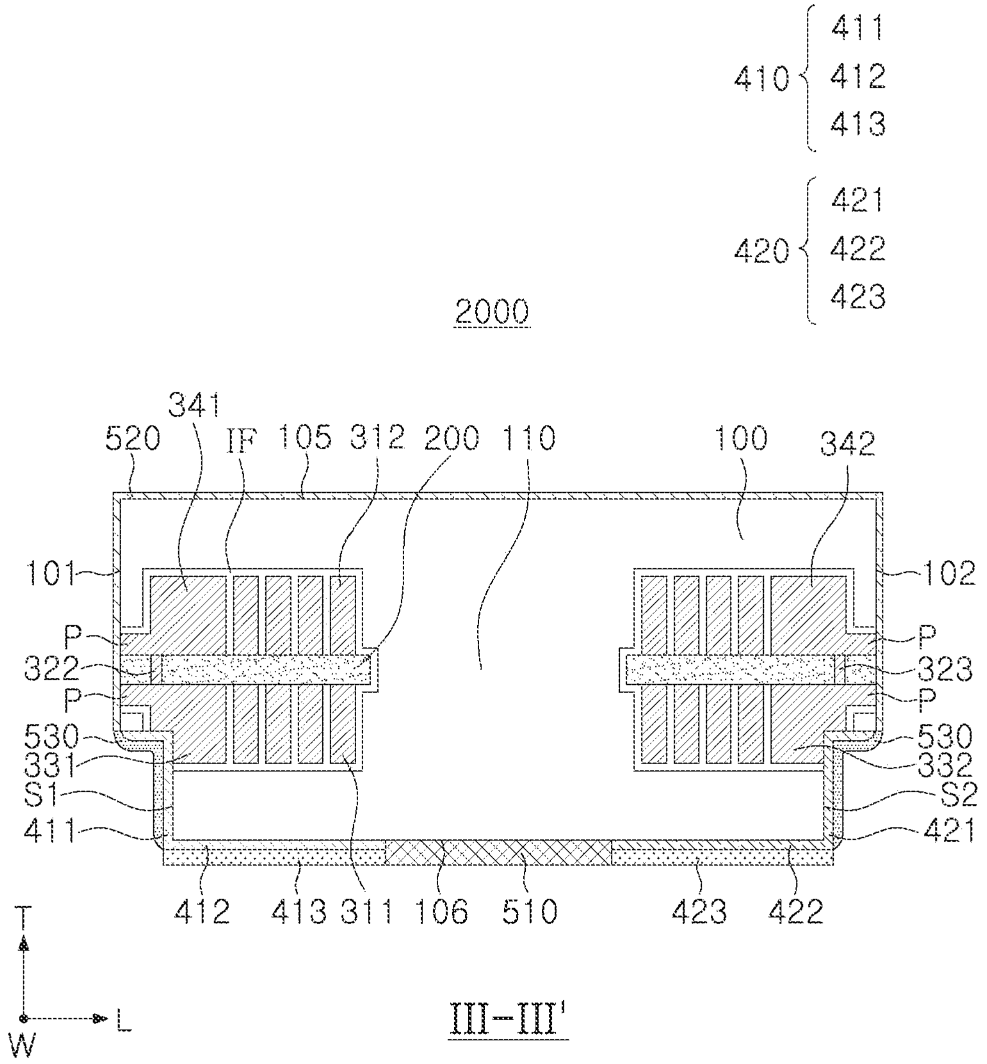
FIG. 16 is a cross-sectional view taken along line III-III' of FIG. 14.

FIG. 14 is a schematic perspective view of a coil component according to another exemplary embodiment of the present disclosure. FIG. 15 is a view in which a portion is omitted from the perspective view of FIG. 14. FIG. 16 is a cross-sectional view taken along line of FIG. 14.

Referring to FIGS. 1 to 9 and FIGS. 14 to 16, a difference between a coil component 2000 according to another exemplary embodiment and the coil component 1000 according to the above-described embodiment lies in a coil portion 300. Therefore, the present embodiment will be described while focusing on only the coil portion 300. The description of the above-described embodiment will be applied to the description of the other configurations of the present embodiment as is.

The coil portion 300, applied to the present embodiment, may further include coupling reinforcement portions P, respectively extending from lead-out patterns 331 and 332 and dummy lead-out patterns 341 and 342 to be exposed to a first surface 101 and a second surface 102 of a body 100. Specifically, the coil portion 300 may further include a first coupling reinforcement portion P extending from the first lead-out pattern 331 to be exposed to the first surface 101 of the body 100, a second coupling reinforcement portion P extending from the second lead-out pattern 332 to be exposed to the second surface 102 of the body 100, a third coupling reinforcement portion P extending from the first dummy lead-out pattern 341 to be exposed to the first surface 101 of the body 100, and a fourth coupling reinforcement portion P extending from the second dummy lead-out pattern 342 to be exposed to the second surface 102 of the body 100. Unlike the above-described embodiment, in the present embodiment, the lead-out patterns 331 and 332 and the dummy lead-out patterns 341 and 342 may not be exposed to the first and second surfaces 101 and 102 of the body 100, and the coupling reinforcement portions P, extending from the lead-out patterns 331 and 332 and the dummy lead-out patterns 341 and 342 to the first and second surfaces 101 and 102 of the body 100, may be exposed to the first and second surfaces 101 and 102 of the body 100.

The coupling reinforcement portion P may have a width less than a width of each of the lead-out patterns 331 and 332 and a width of each of the dummy lead-out patterns 341 and 342 and may have a thickness less than a thickness of each of the lead-out patterns 331 and 332 and a thickness of each of the dummy lead-out patterns 341 and 342. For example, the coupling reinforcement portion P may decrease a volume of a side of an end portion of the coil portion 300 to significantly reduce an area of the coil portion 300 exposed to the first and second surfaces 101 and 102 of the body 100.

Therefore, the coil component 2000 according to the present embodiment may improve coupling force between the coil portion 300 and the body 100 on the side of the end portion of the coil portion 300. For example, a coupling reinforcement portion P, having a volume smaller than a volume of each of the lead-out patterns 331 and 332 and a volume of each of the dummy lead-out patterns 341 and 342, may be disposed on an outermost side of the body 100 in the coil portion 300 to increase an effective volume of the body 100 on an outermost side of the coil component 2000. In addition, the coil component 2000 according to the present embodiment may increase an effective volume of a magnetic material to prevent deterioration of component characteristics. In addition, the coil component 200 according to the present embodiment may decrease an area of the coil portion 300, exposed to both end surfaces 101 and 102 of the body 100, to prevent short-circuits.

The present embodiment may be modified in the same manner as the modified examples of the above-described embodiment.

As described above, according to exemplary embodiments, an effective volume of a magnetic material may be increased.

While exemplary embodiments have been shown and described above, it will be apparent to those skilled in the art that modifications and variations could be made without departing from the scope of the present disclosure as defined by the appended claims.

What is claimed is:

1. A coil component comprising:

a body having one surface, and one end surface and another end surface connected to the one surface and opposing each other;

a coil portion comprising a first lead-out pattern and a second lead-out pattern spaced apart from each other within the body;

a first slit portion and a second slit portion, respectively disposed in an edge portion between the one end surface and the one surface of the body and an edge portion between the another end surface and the one surface of the body to expose the first lead-out pattern and the second lead-out pattern;

a first external electrode and a second external electrode disposed to be spaced apart from each other on the one surface of the body and respectively extending to the first slit portion and the second slit portion to be connected to the first lead-out pattern and the second lead-out pattern; and a surface insulating layer disposed on the one end surface and the another end surface of the body to be in contact with the first lead-out pattern and the second lead-out pattern of the coil portion, wherein the surface insulating layer comprises a first insulating thin film including silicon dioxide ($SiO2$), and a second insulating thin film including aluminum oxide ($Al2O3$).

2. The coil component of claim 1, wherein the surface insulating layer has a thickness of 5 μm or less.

3. The coil component of claim 1, wherein each of the first and second insulating thin films has a thickness of 3 μm or less.

4. The coil component of claim 1, wherein the first and second external electrodes comprise connection portions, respectively disposed in the first and second slit portions to be in contact with and connected to the first and second lead-out patterns, and pad portions, respectively extending from the connection portions to the one surface of the body, and the coil component further comprises slit insulating layers, respectively disposed in the first and second slit portions to cover the connection portions of the first and second external electrodes.

5. The coil component of claim 4, wherein the slit insulating layers have shapes corresponding to the first and second slit portions, respectively.

6. The coil component of claim 4, wherein the connection portion of each of the first and second external electrodes is disposed in a central portion of the body in a width direction in internal surfaces of the first and second slit portions, and wherein the coil component further comprises filling portions, respectively disposed on external sides of the central portions of the first and second slit portions, and the slit insulating layers are disposed in the first and second slit portions to cover the filling portions and the connection portions, respectively.

7. The coil component of claim of claim 6, wherein each of the filling portions includes a magnetic material.

8. The coil component of claim 6, wherein each of the filling portions has one surface, being in contact with an internal wall of each of the first and second slit portions, and another surface facing the one surface of each of the filling portions, and each of the one end surface and the another end surface of the body is coplanar with the another end surface of each of the filling portions.

9. The coil component of claim 4, wherein the pad portions are spaced apart from edges of the one surface in a width direction of the body.

10. The coil component of claim 1, wherein the body further has another surface, opposing the one surface of the body, and one side surface and another side surface connecting the one end surface and the another end surface of the body to each other and opposing each other, and the surface insulating layer is further disposed on the another surface of the body and the one side surface and the another side surface of the body.

11. The coil component of claim 1, further comprising:

a support substrate disposed in the body, wherein the first and second lead-out patterns are disposed to be spaced apart from each other on one surface of the support substrate facing the one surface of the body, and wherein the coil portion further comprises:

a first coil pattern spaced apart from the first lead-out pattern and disposed on the one surface of the support substrate to be connected to the second lead-out pattern;

a second coil pattern disposed on another surface of the support substrate opposing the one surface of the support substrate; and a first dummy lead-out pattern disposed on the another surface of the support substrate to be connected to the second coil pattern.

12. The coil component of claim 11, wherein a distance from at least one of the first and second lead-out patterns to the one surface of the body is less than a distance from the first coil pattern to the one surface of the body.

13. The coil component of claim 11, wherein the first and second lead-out patterns are exposed to the one end surface and the another end surface of the body, respectively.

14. The coil component of claim 11, wherein the coil portion further comprises coupling reinforcement portions, respectively disposed on the first and second lead-out patterns, and respectively having a thickness less than a thickness of each of the first and second lead-out patterns, and the first and second lead-out patterns are spaced apart from the one end surface and the another end surface of the body.

15. The coil component of claim 11, wherein the coil portion further comprises:

a first via penetrating through the support substrate to connect innermost end portions of the first and second coil patterns to each other; and a second via penetrating through the support substrate to connect the first lead-out pattern and the first dummy lead-out pattern to each other.

16. The coil component of claim 15, wherein the coil portion further comprises a second dummy lead-out pattern disposed to be spaced apart from the second coil pattern and the first dummy lead-out pattern on the another surface of the support substrate.

17. The coil component of claim 16, wherein the coil portion further comprises a third via penetrating through the support substrate to connect the second lead-out pattern and the second dummy lead-out pattern to each other.

18. A coil component comprising:

a body having one surface, and one end surface and another end surface connected to the one surface and opposing each other;

a coil portion comprising a first lead-out pattern and a second lead-out pattern spaced apart from each other within the body;

a first slit portion and a second slit portion, respectively disposed in an edge portion between the one end surface and the one surface of the body and an edge portion between the another end surface and the one surface of the body to expose the first lead-out pattern and the second lead-out pattern;

a first external electrode and a second external electrode disposed to be spaced apart from each other on the one surface of the body and respectively extending to the first slit portion and the second slit portion to be connected to the first lead-out pattern and the second lead-out pattern; and a surface insulating layer disposed at least on the one end surface and the another end surface of the body to be in contact with the body and the first lead-out pattern and the second lead-out pattern of the coil portion, wherein the surface insulating layer extends from a portion of one of the first external electrode and the second external electrode respectively disposed in the first and second slit portions.

19. The coil component of claim 18, wherein the surface insulating layer comprises a first insulating thin film including silicon dioxide ($SiO_2$), and a second insulating thin film including aluminum oxide ($Al_2O_3$).

20. The coil component of claim 18, wherein the surface insulating layer has a thickness of 5 μm or less.

21. The coil component of claim 18, wherein the first and second external electrodes comprise connection portions, respectively disposed in the first and second slit portions to be in contact with and connected to the first and second lead-out patterns, and pad portions, respectively extending from the connection portions to the one surface of the body.

22. A coil component comprising:

a body having one surface, and one end surface and another end surface connected to the one surface and opposing each other;

a coil portion comprising a first lead-out pattern and a second lead-out pattern spaced apart from each other within the body;

a first slit portion and a second slit portion, respectively disposed in an edge portion between the one end surface and the one surface of the body and an edge portion between the another end surface and the one surface of the body to expose the first lead-out pattern and the second lead-out pattern;

a first external electrode and a second external electrode disposed to be spaced apart from each other on the one surface of the body and respectively extending to the first slit portion and the second slit portion to be connected to the first lead-out pattern and the second lead-out pattern;

a surface insulating layer disposed at least on the one end surface and the another end surface of the body to be in contact with the first lead-out pattern and the second lead-out pattern of the coil portion; and slit insulating layers, respectively disposed in the first and second slit portions to cover connection portions of the first and second external electrodes, wherein among the surface insulating layer and the slit insulating layers, only the surface insulating layer is deposed on the one end surface and the another end surface of the body.

23. The coil component of claim 22, wherein the surface insulating layer comprises a first insulating thin film including silicon dioxide ($SiO_2$), and a second insulating thin film including aluminum oxide ($Al_2O_3$).

24. The coil component of claim 22, wherein the surface insulating layer has a thickness of 5 μm or less.

25. The coil component of claim of claim 22, wherein the first and second external electrodes further comprise pad portions, respectively extending from the connection portions to the one surface of the body.

26. The coil component of claim of claim 25, further comprising magnetic filling portions, respectively disposed on external sides of central portions of the first and second slit portions, wherein the slit insulating layers cover the magnetic filling portions and the connection portions disposed in the first and second slit portions.

* * * * *